US006970727B1

(12) United States Patent
Klein

(10) Patent No.: US 6,970,727 B1
(45) Date of Patent: Nov. 29, 2005

(54) HANDS-FREE DEVICE WITH BUTTON FOR CELLULAR TELEPHONE SEND/END AND TWO-WAY RADIO PUSH-TO-TALK

(75) Inventor: Richard Ira Klein, San Marcos, CA (US)

(73) Assignee: Klein Electronics, Inc., Escondido, CA (US)

(*) Notice: Subject to any disclaimer, the term of this patent is extended or adjusted under 35 U.S.C. 154(b) by 423 days.

(21) Appl. No.: 10/155,310

(22) Filed: May 23, 2002

Related U.S. Application Data

(63) Continuation-in-part of application No. 09/931,314, filed on Aug. 17, 2001, now abandoned.

(51) Int. Cl.7 .................................................. H04B 1/38
(52) U.S. Cl. .................................. 455/575.2; 455/90.2
(58) Field of Search ..................... 376/430; 455/575.2, 455/3.05, 518, 566, 567, 569.1, 519, 90.2, 455/15, 557; 379/174, 428.02, 430, 427, 379/428.04

(56) References Cited

U.S. PATENT DOCUMENTS

| | | | | |
|---|---|---|---|---|
| 5,487,182 | A | 1/1996 | Hansson | |
| 5,794,163 | A | 8/1998 | Paterson et al. | |
| 5,802,167 | A | 9/1998 | Hong | |
| 5,881,370 | A | 3/1999 | Pottala et al. | |
| 6,154,539 | A | 11/2000 | Pitel | |
| 6,212,365 | B1 | 4/2001 | Goeb | |
| 6,522,894 | B1 * | 2/2003 | Schmidt | 455/552.1 |
| 2003/0003969 | A1 * | 1/2003 | Tong et al. | 455/568 |
| 2004/0077382 | A1 * | 4/2004 | Verity | 455/569.1 |

FOREIGN PATENT DOCUMENTS

| | | | | |
|---|---|---|---|---|
| JP | 09-172697 | * | 6/1997 | H04R 1/10 |

OTHER PUBLICATIONS

"NEXTEL Hands-Free Accessories" brochure, Feb. 2002, 2 pages, Klein Electronics, Escondido, U.S.A.
"Klein Wireless" brochure, Jan. 2000, 2 pages, Klein Electronics, Escondido, U.S.A.
"K1000PTT Product Overview", Jul. 2001, 1 page, Klein Electronics, Escondido, U.S.A.

(Continued)

*Primary Examiner*—Nay Maung
*Assistant Examiner*—Tu X Nguyen
(74) *Attorney, Agent, or Firm*—Timothy N. Ellis

(57) ABSTRACT

The send, end, and push-to-talk functions of a combination cellular telephone/two-way radio, are controlled with a single button on a hands-free device having a cable attached to the button, a microphone, and an earpiece. The button is pressed to instruct the cellular telephone/two-way radio to transmit in a half-duplex communications mode for a two-way radio conversation. The user speaks while continuing to press the button, to transmit the user's words in the two-way radio conversation. Next, the user releases the button, to instruct the cellular telephone/two-way radio to cease transmitting, to permit the user to hear words transmitted by the other party to the two-way radio conversation. Additionally, the user may answer an incoming cellular telephone call by pressing the button used during the two-way radio conversation, to instruct the cellular telephone/two-way radio to establish communications for a full duplex cellular telephone conversation.

5 Claims, 24 Drawing Sheets

OTHER PUBLICATIONS

"Samsung SCH-850 Accessory Guide", 1999, 2 pages, Samsung Telecommunications America, Inc., Richardson, U.S.A.

"Klein Electronics: Earphone With In-Line Mic. and PTT (Push-to-talk) Button", HeadsetUSA webpage, May 16, 2002, 1 page, http://www.headsetusa.com/ . . . .

"Klein Electronics: iDen/NEXTEL Earpiece Kits", HeadsetUSA webpages, May 16, 2002, pp. 1-3, http://www.headsetusa.com/ . . . .

Klein, Richard, declaration, Jul. 16, 2003, 2 pages plus exhibits.

* cited by examiner

HANDS-FREE DEVICE WITH BUTTON FOR CELLULAR TELEPHONE SEND/END AND TWO-WAY RADIO PUSH-TO-TALK

CROSS-REFERENCE TO RELATED APPLICATIONS

This application is a continuation-in-part of U.S. patent application Ser. No. 09/931,314 filed Aug. 17, 2001 now abandoned, titled "Trinity series, hands-free kit, model K1000pi", which is incorporated herein by this reference.

BACKGROUND

1. Field of the Invention

The present invention relates to hands-free devices for telephonic communications. More particularly, the invention concerns controlling the send, end, and push-to-talk functions of a combination cellular telephone/two-way radio, with a button on a hands-free device.

2. Description of Related Art

"Hands-free" devices which permit having telephonic conversations without holding a telephone, are widely used. A hands-free device typically includes a small speaker which is placed near a user's ear, a microphone, and a cable for connecting the speaker and microphone to the telephone. Hands-free devices have been particularly useful with cellular telephones.

Generally, cellular telephones have a button for establishing communication connections, typically designated "send", and also have a button for terminating communication connections, typically designated "end". To establish a connection for a conversation, a user typically enters a telephone number on a keypad, or selects a number from a stored directory of numbers, and then presses the send button. When a user receives a call, which for example, may be indicated by the telephone ringing or vibrating, typically the user presses the send button to answer the telephone and establish a connection for a conversation. To end a conversation, the user presses the end button to terminate the connection.

Communications with cellular telephones are conducted in conjunction with a cellular telephone network which includes base stations, which wirelessly transmit information to, and receive information from, cellular telephones, and which are coupled to the public switched telephone network. Communications over cellular telephones are typically full-duplex, which means that both parties to the conversation can simultaneously send and receive information.

The functionality of two-way radios has been added to a cellular telephone network, and to specific cellular telephones that function with the network, in products known as Motorola's Integrated Digital Enhanced Network (iDEN™), and Nextel Communication's Direct Connect™. When using the digital two-way radio feature, a user selects the user identification number of another user from a directory, and then presses a "push-to-talk" (PTT) button on the combination cellular telephone/two-way radio in order to instantly transmit to the other user's cellular telephone/two-way radio, through the digital cellular telephone/two-way radio network. If the intended recipient of the transmission is in a service area defined by the cellular system operator, and has the two-way radio functionality of their cellular telephone/two-way radio turned on, and is not in another conversation, the intended recipient will hear the transmitting sender speaking immediately after the sender presses the PTT button, and without the delay of waiting for the receiver's telephone to ring and be answered. If a user attempts to commence a two-way radio conversation with another user that is engaged in a cellular telephone conversation, the user's cellular telephone/two-way radio will produce a tone indicating that the other user's two-way radio is not available. If a caller places a telephone call to the cellular telephone in a cellular telephone/two-way radio, while the two-way radio is being used, the caller will be forwarded to voicemail for the cellular telephone. When using the two-way radio function, a user must hold down the PTT button while speaking and transmitting to one or more other users, and must release the PTT button in order to receive and hear a transmission from one or more users. Thus, the PTT button controls the transmit/receive, talk/listen, function. This type of communication, in which a user cannot simultaneously transmit and receive information, is called half-duplex, and is in contrast with cellular telephone communications, which are full-duplex. To permit usage of the two-way radio function, combination cellular telephone/two-way radios have a PTT button on the combination cellular telephone/two-way radio.

A known type of hands-free device for a two-way radio includes two cables attached to a common plug, which connects to the two-way radio. A PTT button is attached to the end of the first cable, and a microphone and an earbud (a small speaker which is placed in the user's ear) are attached to the second cable. Due to the second cable required for the PTT button, this type of hands-free device has proven inadequate for many applications. This type of hands-free device is also inadequate for use with a combination cellular telephone/two-way radio, because the microphone and earpiece in this type of device do not function with a combination cellular telephone/two-way radio, and because this type of device does not have the ability to control the send or end cellular telephone functions. Hands-free devices for cellular telephones have also proven inadequate for combination cellular telephone/two-way radios, because they lack a button that has the ability to control the two-way radio PTT function.

SUMMARY

Broadly, the present invention concerns controlling the send, end, and push-to-talk functions of a combination cellular telephone/two-way radio, with a button on a hands-free device. The invention may be practiced with a hands-free device that includes a button that is attached to a cable that is coupled at one end to a combination cellular telephone/two-way radio, and that is also attached to a microphone and an earpiece.

One aspect of the invention may be practiced by first pressing the button attached to the cable, to instruct the cellular telephone/two-way radio to transmit in a half-duplex communications mode for a two-way radio conversation. The user speaks while continuing to press the button, to transmit the user's words in the two-way radio conversation. Next, the user releases the button, to instruct the cellular telephone/two-way radio to cease transmitting, to permit the user to hear the words transmitted by the other party to the two-way radio conversation. After completing the two-way radio conversation, the user may answer an incoming cellular telephone call by pressing the button used during the two-way radio conversation, to instruct the cellular telephone/two-way radio to establish communications for a full duplex cellular telephone conversation.

The invention affords its users with a number of distinct advantages. Chiefly, the invention permits using a hands-free device with a combination cellular telephone/two-way radio, and also permits controlling both the send and end cellular telephone functions, and the push-to-talk two-way radio function, of the combination cellular telephone/two-way radio with a single button on the hands-free device. One example of the invention also provides the benefit of attaching the button, microphone, and earpiece of the hands-free device to a single cable. The invention also provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings. As mentioned above, the invention concerns controlling the send, end, and push-to-talk functions of a combination cellular telephone/two-way radio, with a button on a hands-free device.

A "cable" is defined as a group of wires and insulating material that are attached or bundled together. "In-line" means attached directly to the cable. "Mid position" means anywhere between the ends of the cable, but not including either end.

I. Hardware Components and Interconnections

FIRST EXAMPLE

One aspect of the invention concerns a single-cable hands-free device which permits hands-free communications when using a combination cellular telephone/two-way radio, and which includes a button which can be pushed to instruct the cellular telephone/two-way radio to transmit in a half duplex communications mode for a two-way radio conversation, and to instruct the cellular telephone/two-way radio to establish communications for a full duplex cellular telephone conversation.

Figure 1:
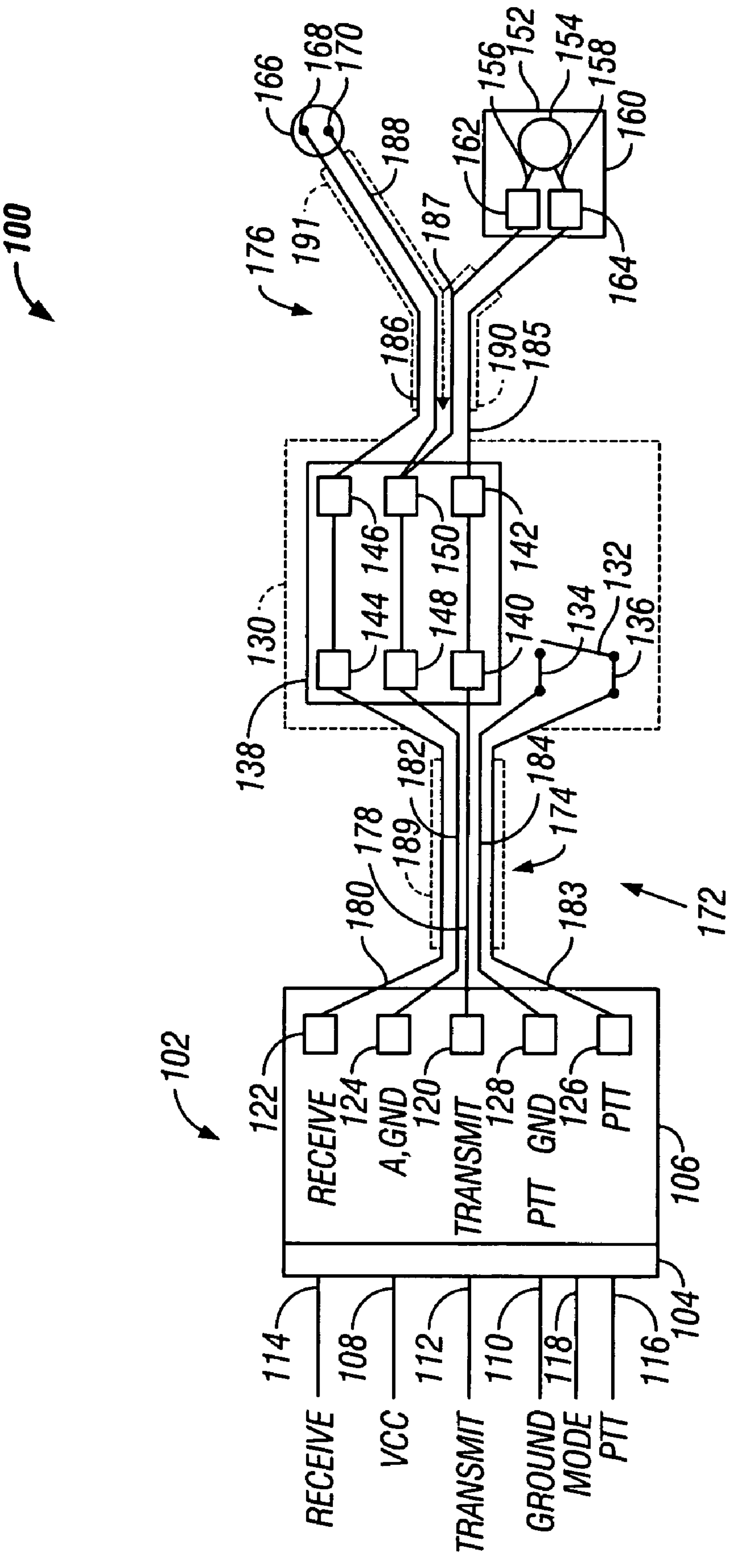
FIG. 1 is a block diagram of a hands-free device in accordance with an illustrative embodiment of the invention.

As an example, this hands-free device may be embodied by various hardware components and interconnections as shown in FIG. 1. More specifically, the hands-free device 100 includes a plug assembly 102 having a plug 104 and a plug assembly circuit board 106. The plug 104 has a VCC pin 108, a ground pin 110, a transmit pin 112, a receive pin 114, a PTT pin 116, and a mode pin 118. The plug assembly circuit board 106 has a transmit connection area 120 coupled to the transmit pin 112, a receive connection area 122 coupled to the receive pin 114, an analog ground connection area 124 coupled to the ground pin 110, a PTT connection area 126 coupled to the PTT pin 116, and a PTT ground connection area 128 coupled to the ground pin 110. The connection areas may be, for example, pads or terminals. "Transmit" may also be referred to as "audio in" (to the cellular telephone/two-way radio), and "receive" may also be referred to as "audio out" (from the cellular telephone/two-way radio) for example, as shown in FIGS. 14A–B and 15A–B. The plug assembly 102 advantageously attaches directly to a connector on specific cellular phones without the need of an adaptor or connector.

The hands-free device 100 also has a switch assembly 130, which includes a momentary contact switch 132 that has a depressed position and a nondepressed position, and a first terminal 134 and a second terminal 136. In one example the first terminal 134 is coupled to the second terminal 136 when the momentary contact switch 132 is in the depressed position. In an alternative design, the switch could be a normally closed switch. The switch assembly 130 also includes a switch assembly circuit board 138 that has a primary transmit pad 140 coupled to a secondary transmit pad 142, a primary receive pad 144 coupled to a secondary receive pad 146, and a primary analog ground pad 148 coupled to a secondary analog ground pad 150. The switch 132 may also be referred to as a button or as a push-to-talk (PTT) button.

The hands-free device 100 also has a microphone assembly 152 which includes a microphone 154 that has a first lead 156 and a second lead 158, and a microphone assembly circuit board 160. The microphone assembly circuit board 160 has a transmit pad 164 and an analog ground pad 162. The hands-free device 100 also has an earpiece 166 that has a first connector 168 and a second connector 170.

Additionally, the hands-free device 100 has a single cable 172, which has a base section 174 and an extension section 176. The base section 174 includes a transmit wire 178 that has a proximal end that is coupled to the transmit connection area 120, and a distal end that is coupled to the primary transmit pad 140 on the switch assembly circuit board 138. The base section 174 also includes a receive wire 180 that has a proximal end that is coupled to the receive connection area 122, and a distal end that is coupled to the primary receive pad 144 on the switch assembly circuit board 138. The base section 174 also includes an analog ground wire 182 that has a proximal end coupled to the analog ground connection area 124, and a distal end coupled to the primary analog ground pad 148 on the switch assembly circuit board 138. The base section 174 further includes a PTT wire 183 that has a proximal end that is coupled to the PTT connection area 126, and a distal end that is coupled to the second terminal 136 of the momentary contact switch 132. The base section 174 also includes a PTT ground wire 184 that has a proximal end that is coupled to the PTT ground connection area 128, and a distal end of the PTT wire that is coupled to the first terminal 134 of the momentary contact switch 132.

The extension section 176 of the single cable 172 includes a transmit wire extension 185 having a proximal end that is coupled to the secondary transmit pad 142 on the switch assembly circuit board 138, and a distal end that is coupled to the transmit pad 164 on the microphone assembly circuit board 160. The extension section 176 also includes a receive wire extension 186 that has a proximal end that is coupled to the secondary receive pad 146 on the switch assembly circuit board 138, and a distal end that is coupled to the first connector 168 of the earpiece 166. The extension section 176 also includes a first analog ground wire extension 187 that has a proximal end coupled to the secondary analog ground pad 150 on the switch assembly circuit board 138, and a distal end that is coupled to the analog ground pad 162 on the microphone assembly circuit board 160. The extension section 176 further includes a second analog ground wire extension 188 that has a proximal end that is coupled to the secondary analog ground pad 150 on the switch assembly circuit board 138, and a distal end that is coupled to the second connector 170 of the earpiece 166.

The single cable has a first insulating sheath 189 that encloses the transmit wire 178, the receive wire 180, the analog ground wire 182, the PTT wire 183, and the PTT ground wire 184, between the plug assembly 102 and the switch assembly 130. The single cable also has a second insulating sheath 190 that encloses the transmit wire extension 185 and the first analog ground wire extension 187, between the switch assembly 130 and the microphone assembly 152. The single cable also has a third insulating sheath 191 that encloses the receive wire extension 186 and the second analog ground wire extension 188 between the switch assembly 130 and the earpiece 166.

The switch assembly 130 may be referred to as being in-line, because it is attached directly to the single cable 172, and because it is attached to the cable 172 at a location that is not at an end of the cable 172.

SECOND EXAMPLE

Figure 2:
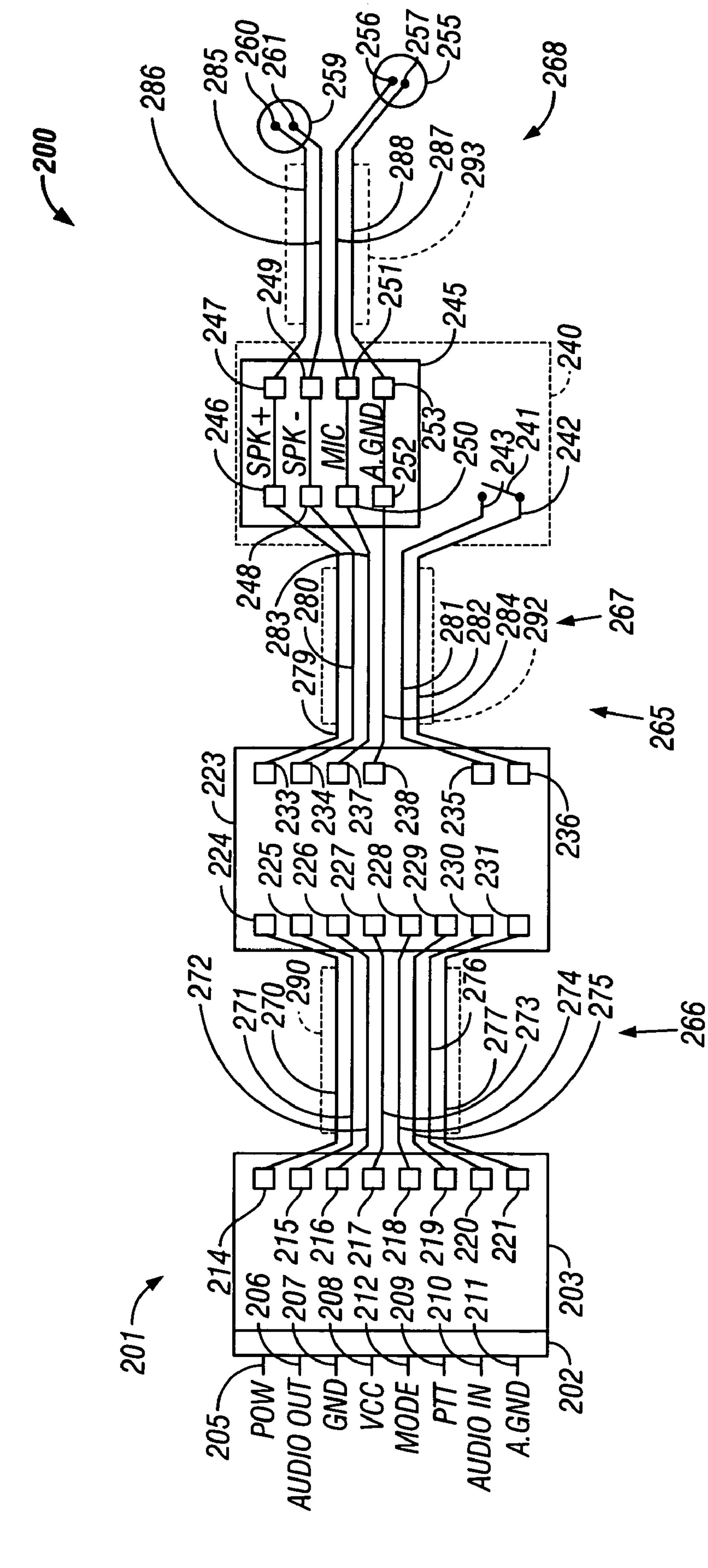
FIG. 2 is a block diagram of a hands-free device in accordance with an illustrative embodiment of the invention.

FIG. 2 illustrates a second example of a hands-free device 200 which includes a plug assembly 201 that has a plug 202 and a plug assembly circuit board/terminal interface 203. The plug 202 has a POW pin 205, an audio out pin 206, a ground pin 207, a VCC pin 208, a PTT pin 209, an audio in pin 210, an analog ground pin 211, and a mode pin 212. The plug assembly circuit board/terminal interface 203 has a POW connection area 214 coupled to the POW pin 205, an audio out connection area 215 coupled to the audio out pin 206, a ground connection area 216 coupled to the ground pin

207, a VCC connection area 217 coupled to the VCC pin 208, a mode connection area 218 coupled to the mode pin 212, a PTT connection area 219 coupled to the PTT pin 209, an audio in connection area 220 coupled to the audio in pin 210, and an analog ground connection area 221 coupled to the analog ground pin 211. The plug assembly 201 advantageously attaches directly to a connector on specific cellular phones without the need of an adaptor or connector.

The hands-free device 200 also includes an interface circuit board 223 which has a POW pad 224, an audio out pad 225, a first ground pad 226, a VCC pad 227, a mode pad 228, a first PTT pad 229, an audio in pad 230, an analog ground pad 231, a positive speaker pad 233, a negative speaker pad 234, a second PTT pad 235, a second ground pad 236, a mic pad 237, and a second analog ground pad 238. The hands-free device 200 also includes a switch assembly 240 that has a momentary contact switch 241 that has a depressed position and a nondepressed position, and a first terminal 242 and a second terminal 243. The first terminal 242 is coupled to the second terminal 243 when the momentary contact switch 241 is in the depressed position. The switch assembly 240 also has a switch assembly circuit board 245 that has a primary positive speaker pad 246 coupled to a secondary positive speaker pad 247, a primary negative speaker pad 248 coupled to a secondary negative speaker pad 249, a primary mic pad 250 coupled to a secondary mic pad 251, and a primary analog ground pad 252 coupled to a secondary analog ground pad 253.

The hands-free device 200 also has a microphone 255 that has a mic connection area 256 and an analog ground connection area 257, and an earpiece 259 that has a positive speaker connection area 260 and a negative speaker connection area 261.

The hands-free device 200 also has a single cable 265 that has a base section 266, a middle section 267, and an extension section 268. The base section 266 includes a POW wire 270 that has a proximal end coupled to the POW connection area 214 and a distal end coupled to the POW pad 224, an audio out wire 271 having a proximal end coupled to the audio out connection area 215 and a distal end coupled to the audio out pad 225, and a ground wire 272 having a proximal end coupled to the ground connection area 216 and a distal end coupled to the first ground pad 226. The base section 266 further includes a VCC wire 273 having a proximal end coupled to the VCC connection area 217 and a distal end coupled to the VCC pad 227, a mode wire 274 having a proximal end coupled to the mode connection area 218 and a distal end coupled to the mode pad 228, a first PTT wire 275 having a proximal end coupled to the PTT connection area 219 and a distal end coupled to the first PTT pad 229, an audio in wire 276 having a proximal end coupled to the audio in connection area 220 and a distal end coupled to the audio in pad 230, and a first analog ground wire 277 having a proximal end coupled to the analog ground connection area 221 and a distal end coupled to the analog ground pad 231.

The middle section 267 of the single cable 265 includes a positive speaker wire 279 that has a proximal end coupled to the positive speaker pad 233 on the interface circuit board 223 and a distal end coupled to the primary positive speaker pad 246 on the switch assembly circuit board 245. The middle section 267 also has a negative speaker wire 280 that has a proximal end coupled to the negative speaker pad 234 on the interface circuit board 223 and a distal end coupled to the primary negative speaker pad 248 on the switch assembly circuit board 245. The middle section 267 further includes a second PTT wire 281 having a proximal end coupled to the second PTT pad 235 on the interface circuit board 223, and a distal end coupled to the second terminal 243 of the momentary contact switch 241. The middle section 267 also includes a PTT ground wire 282 that has a proximal end coupled to the second ground pad 236 on the interface circuit board 223, and a distal end coupled to the first terminal 242 of the momentary contact switch 241. The middle section 267 also has a mic wire 283 that has a proximal end coupled to the mic pad 237 on the interface circuit board 223, and a distal end coupled to the primary mic pad 250 on the switch assembly circuit board 245. Additionally, the middle section 267 has a second analog ground wire 284 that has a proximal end coupled to the second analog ground pad 238 on the interface circuit board 223, and a distal end coupled to the primary analog ground pad 252 on the switch assembly circuit board 245.

The extension section 268 of the single cable 265 includes a positive speaker wire extension 285 that has a proximal end coupled to the secondary positive speaker pad 247 on the switch assembly circuit board 245, and a distal end coupled to the positive speaker connection area 260 on the earpiece 259. The extension section 268 also includes a negative speaker wire extension 286 having a proximal end coupled to the secondary negative speaker pad 249 on the switch assembly circuit board 245, and a distal end coupled to the negative speaker connection area 261 on the earpiece 259. The extension section 268 further includes a mic wire extension 287 that has a proximal end coupled to the secondary mic pad 251 on the switch assembly circuit board 245, and a distal end coupled to the mic connection area 256 on the microphone 255. The extension section 268 also includes an analog ground wire extension 288 that has a proximal end coupled to the secondary analog ground pad 253 on the switch assembly circuit board 245, and a distal end coupled to the analog ground connection area 257 on the microphone 255.

The single cable 265 includes a first insulating sheath 290 enclosing the POW wire 270, the audio out wire 271, the ground wire 272, the VCC wire 273, the first PTT wire 275, the audio in wire 276, and the first analog ground wire 277, in the base section 266 of the single cable 265. The cable 265 also has a second insulating sheath 292 enclosing the positive speaker wire 279, the negative speaker wire 280, the second PTT wire 281, the PTT ground wire 282, the mic wire 283, and the second analog ground wire 284 in the middle section 267 of the single cable 265. The cable 265 also has a third insulating sheath 293 enclosing the positive speaker wire extension 285, the negative speaker wire extension 286, the mic wire extension 287, and the analog ground wire extension 288 over at least a portion of the extension section 268 of the single cable 265.

Figure 14A:
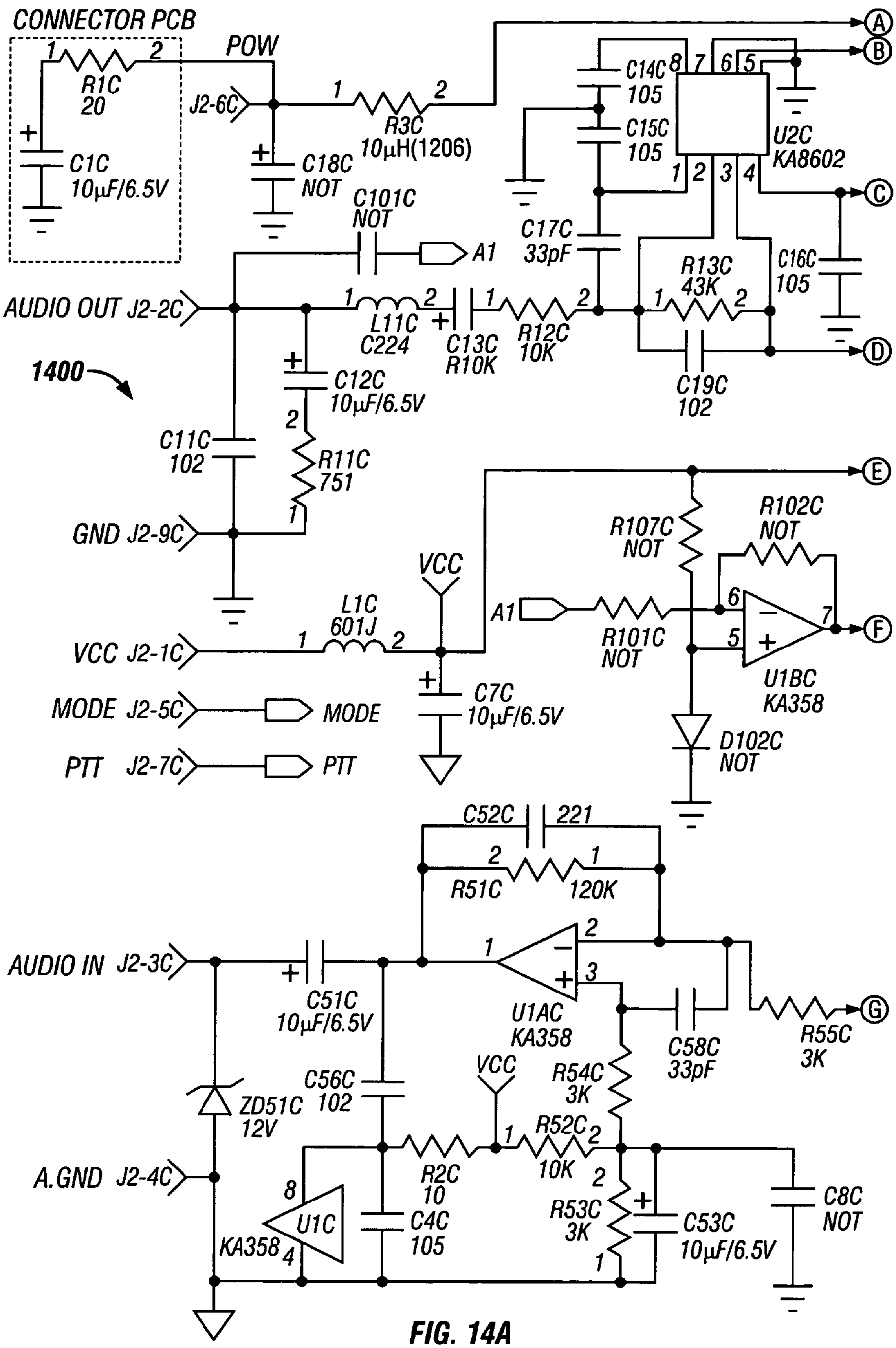
FIGS. 14A and 14B are a schematic diagram of an interface circuit board in accordance with an illustrative embodiment of the invention.
Figure 14B:
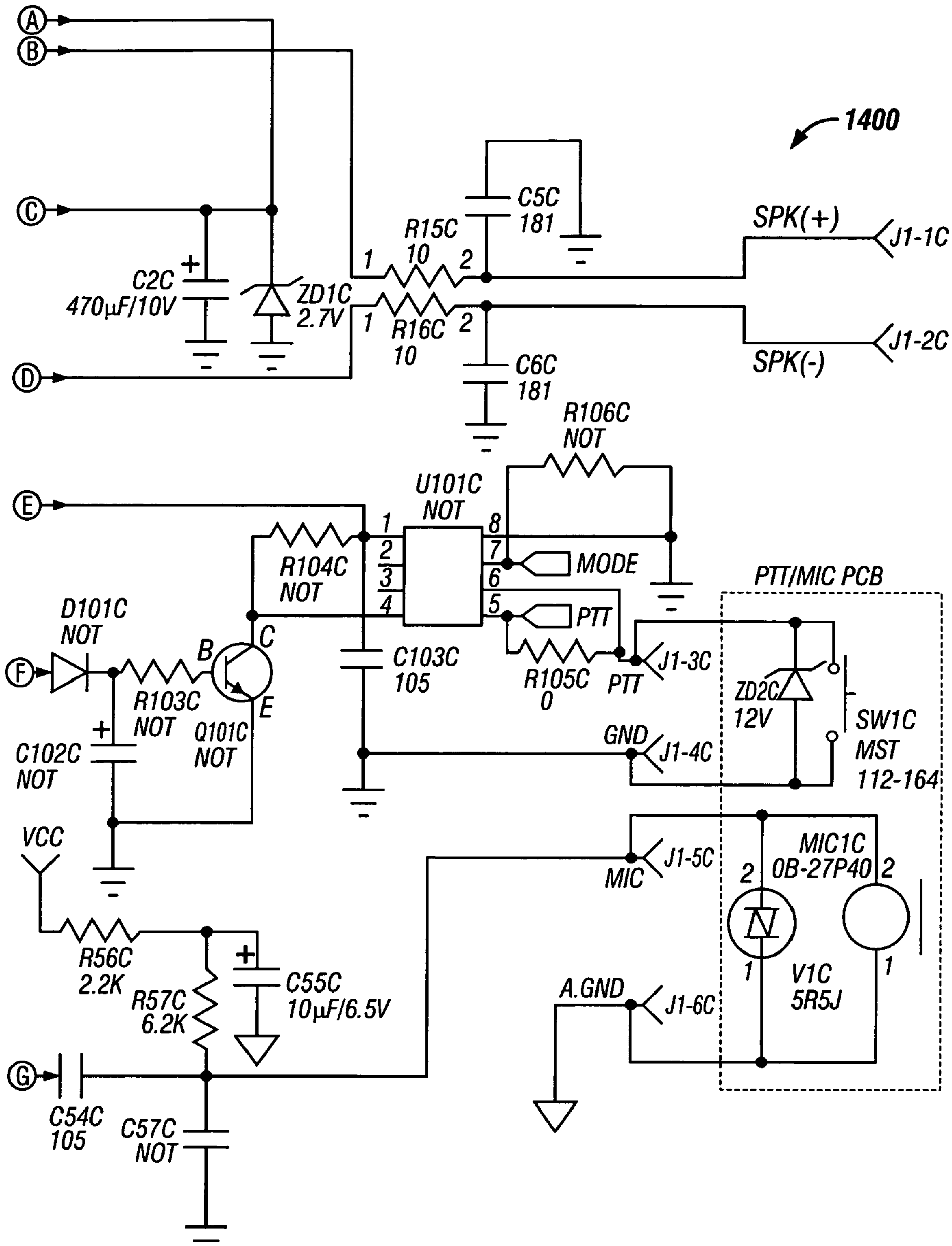
Figure 15A:
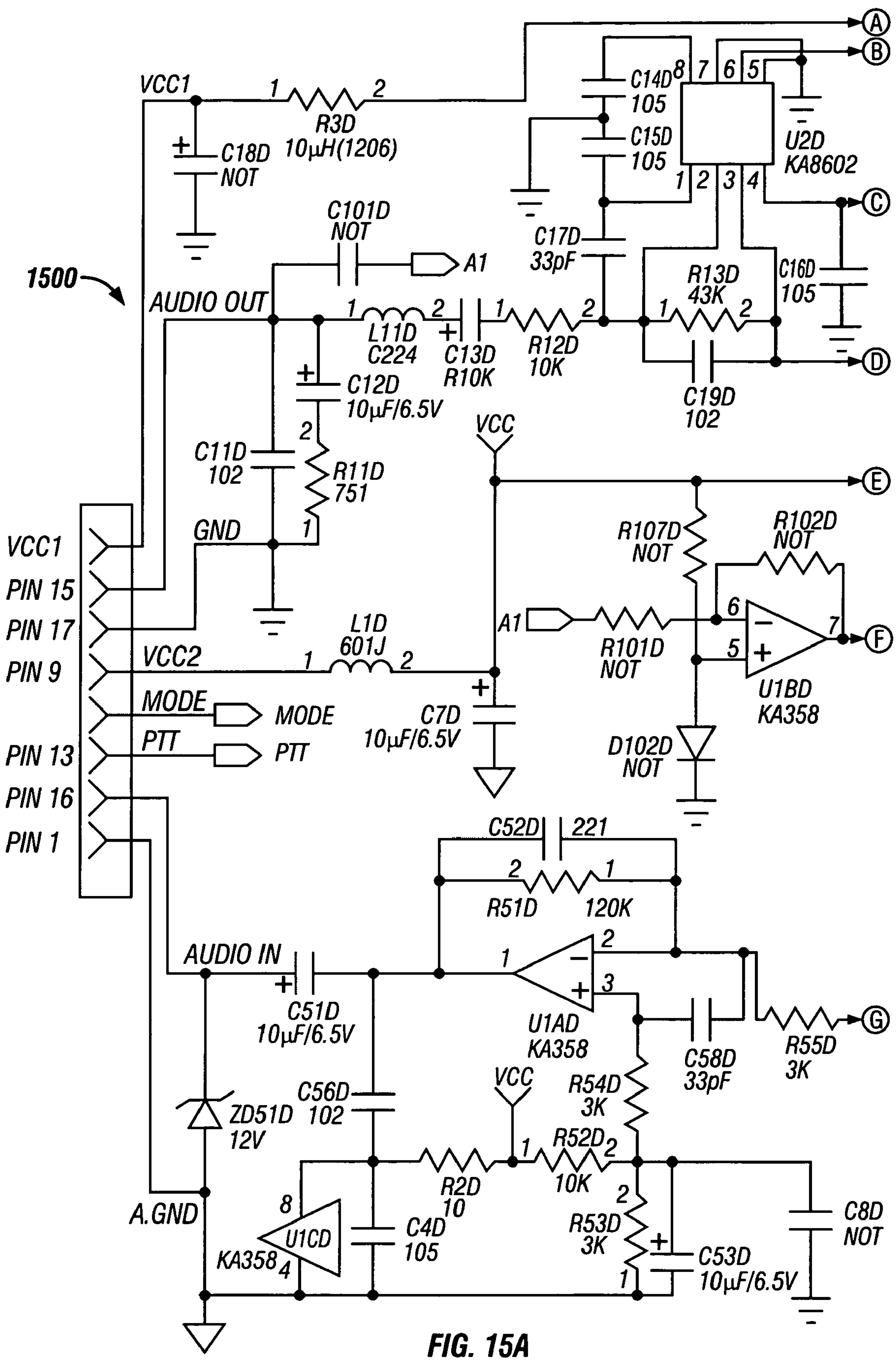
FIGS. 15A and 15B are a schematic diagram of an interface circuit board in accordance with an illustrative embodiment of the invention.
Figure 15B:
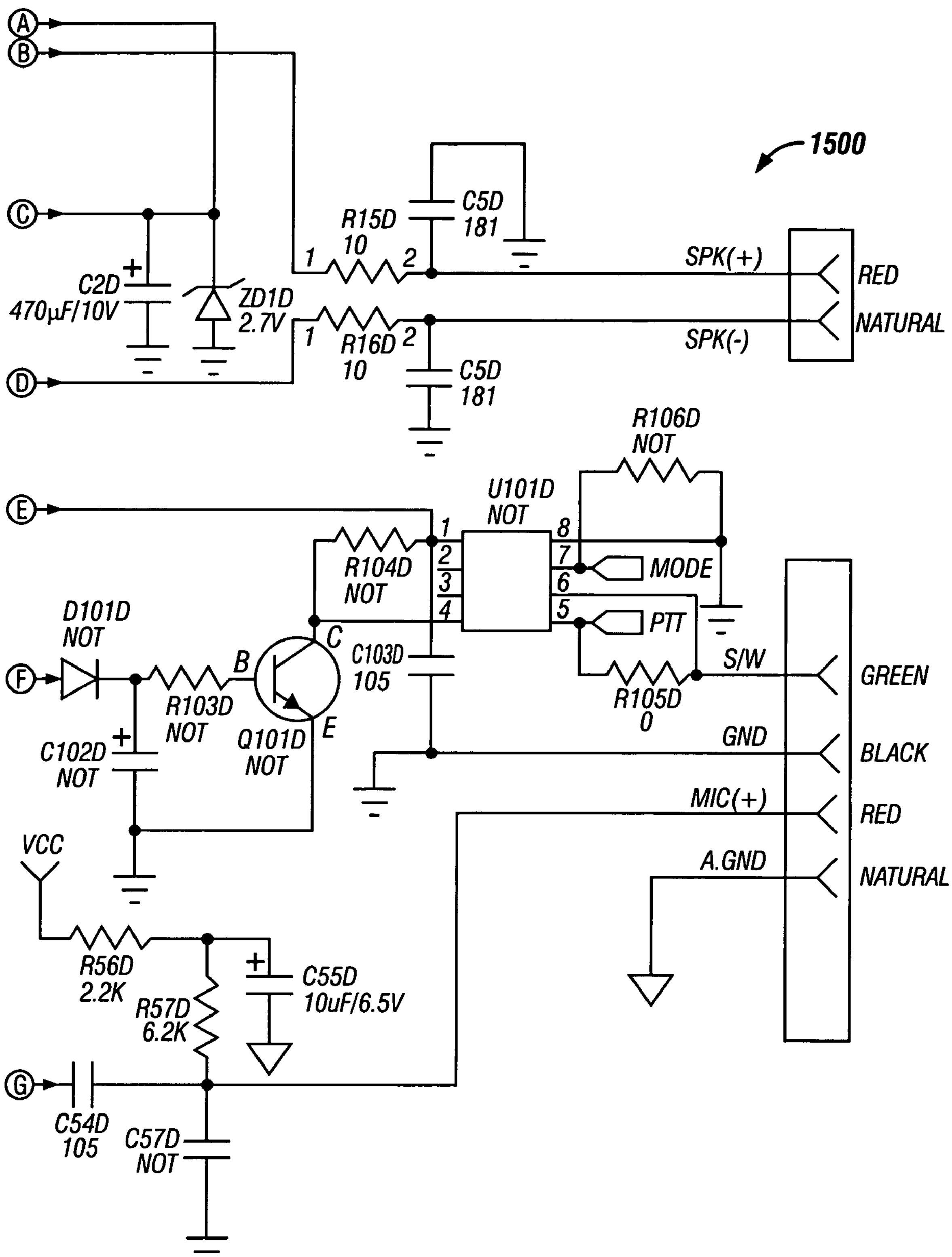

FIGS. 14A–B and 15A–B are schematic diagrams of interface circuit boards 223 in accordance with illustrative embodiments of the invention. In FIGS. 14A–B and 15A–B, U101C and U101D are PIC12LC508 integrated circuits which may be used for the optional vibrate function, and U2C and U2D are S1T8602B01 (KA8602B) audio amplifiers. In FIGS. 15A–B, VCC1 is a power supply voltage for the audio amplifier U2D, and VCC2 is a general power supply voltage for the circuit board.

ADDITIONAL EXAMPLES

An earpiece 166, 259 includes a speaker of appropriately small size, and may be, for example, an earbud, an earloop, a headset, a behind the head headset, a submersible headset, or an acoustic audio tube and eartip. An acoustic tube embodiment may include two cables, with the PTT button and microphone attached to one cable, and the earpiece attached to the other cable. In one example the microphone is attached in-line to a mid point on a cable, and alternatively, the microphone is attached to a boom. In another example of the invention, the microphone, speaker, and PTT button are all in a single module attached to the end of a cable. In another example, the PTT button is attached to the end of a first cable, and the microphone and speaker are attached to a second cable. Alternatively, the microphone can be included in an enclosure with the PTT button on the first cable. In one example, the earpiece may have a silver-metallic appearance. In one example, the microphone is omnidirectional. Alternatively, other directionality patterns could be used.

Circuitry on the plug assembly circuit board 106, 203 or on the interface circuit board 223 may be modified to provide different optional functions. For example, the circuitry may be modified to enable or disable the capability of the PTT button 132, 241 to answer incoming cellular telephone calls. The circuitry may be modified to provide the capability for the cellular telephone/two-way radio to vibrate when receiving an incoming cellular telephone call. The circuitry may be modified to provide the capability for the cellular telephone/two-way radio to ring out loud when receiving an incoming cellular telephone call. The circuitry may be modified to provide the capability for a ringing sound to be produced in the earpiece when an incoming cellular telephone call is received. The circuitry could also be modified to provide the capability to place a cellular call by pressing the PTT button 132, 241, after entering or selecting on the telephone, a telephone number to be dialed. The circuitry could also be modified to provide the capability to terminate a cellular telephone call by pressing the PTT button 132, 241.

As an example, the invention is operated with a cellular network that uses Time Division Multiple Access (TDMA) technology. However, the invention also could be implemented with Code Division Multiple Access (CDMA), Frequency Division Multiple Access (FDMA), PCS, or GSM. As an example, the invention is operated with a digital cellular network. However, an analog network could also be used.

II. Operation

In addition to the various hardware embodiments described above, a different aspect of the invention concerns a method for instructing a combination cellular telephone/two-way radio to transmit in a half duplex communications mode for a two-way radio conversation, and for instructing the cellular telephone/two-way radio to establish communications for a full duplex cellular telephone conversation, by pressing a button attached on a single cable which is coupled at one end to the cellular telephone/two-way radio, and which is also attached to a microphone and a speaker. As described below, two cables can also be used. For ease of explanation, but without any intended limitation, the examples below are described in the context of the hands-free devices described above in the hardware section.

Overall Sequence of Operation

FIRST EXAMPLE

Figure 30:
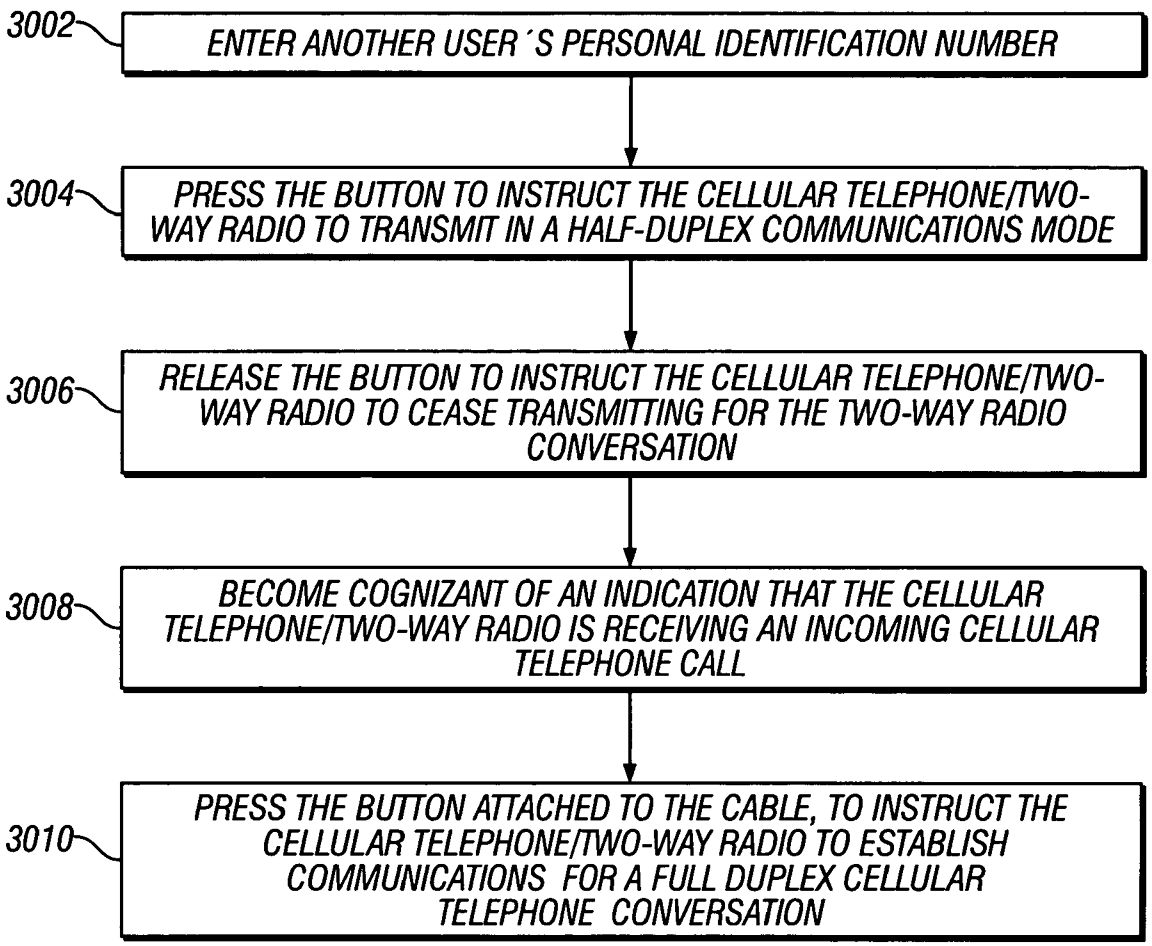
FIG. 30 is a flowchart of an operational sequence for operating a hands-free device with a cellular telephone/two-way radio in accordance with an illustrative embodiment of the invention.

One example of the method aspect of the present invention is illustrated in FIG. 30. FIG. 30 shows a method for using a button 132, 241 attached to a single cable 172, 265 attached to a microphone 154, 255, a speaker (for example included in earpiece 166, 259), and a cellular telephone/two-way radio, for instructing the cellular telephone/two-way radio to transmit in a half duplex communications mode for a two-way radio conversation, and for instructing the cellular telephone/two-way radio to establish communications for a full duplex cellular telephone conversation. The method begins with the step 3002 of entering another user's personal identification number into the cellular telephone/two-way radio, for example, by using a keypad or selecting the number from a directory on the cellular telephone/two-way radio. Next, in step 3004, the user presses the button 132, 241 to instruct the cellular telephone/two-way radio to transmit in a half-duplex communications mode for a two-way radio conversation. Next, in step 3006, the button 132, 241 attached to the cable 172, 265 is released to instruct the cellular telephone/two-way radio to cease transmitting for the two-way radio conversation, and to permit the cellular telephone/two-way radio to receive in a half duplex communications mode for the two-way radio conversation so the user can hear a received transmission. In step 3008, while not engaged in a two-way radio conversation, the user becomes cognizant of an indication that the cellular telephone/two-way radio is receiving an incoming cellular telephone call. The user may become cognizant of an indication that the cellular telephone/two-way radio is receiving an incoming cellular telephone call by, for example, hearing a ringing tone generated in an earpiece, hearing a ringing tone generated in the cellular telephone/two-way radio, or by feeling or hearing the cellular telephone/two-way radio vibrate. Finally, in step 3010, responsive to becoming cognizant of the indication that the cellular telephone/two-way radio is receiving an incoming cellular telephone call, the user presses the button 132, 241 attached to the cable 172, 265, to instruct the cellular telephone/two-way radio to establish communications for a full duplex cellular telephone conversation.

SECOND EXAMPLE

Figure 31:
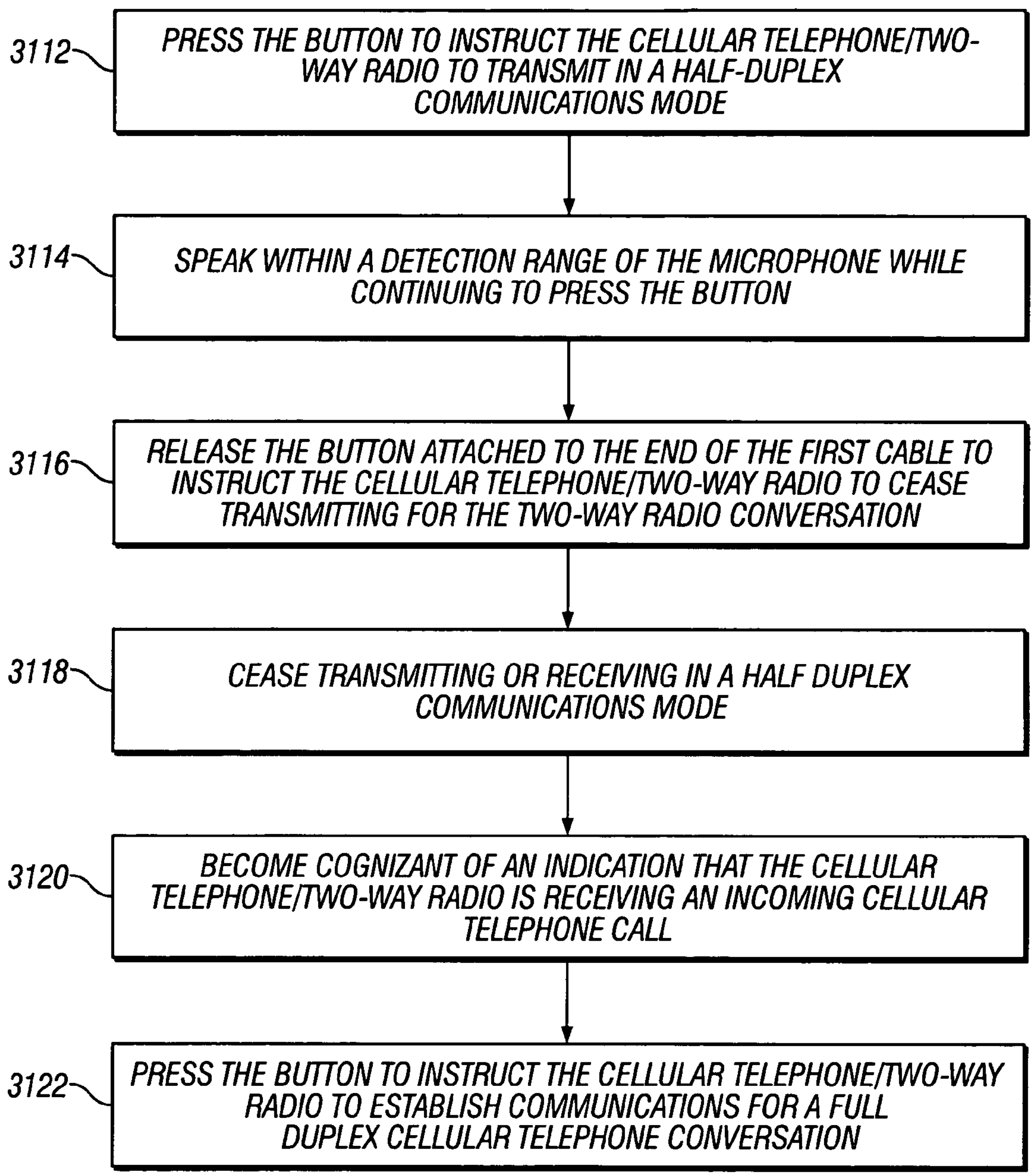
FIG. 31 is a flowchart of an operational sequence for operating a hands-free device with a cellular telephone/two-way radio in accordance with an illustrative embodiment of the invention.

Another example of the method aspect of the present invention is illustrated in FIG. 31. FIG. 31 shows a method for instructing a cellular telephone/two-way radio to transmit in a half duplex communications mode for a two-way radio conversation, and for instructing the cellular telephone/two-way radio to establish communications for a full duplex cellular telephone conversation, by pressing a button attached to the end of a first cable which is coupled to the cellular telephone/two-way radio, and speaking into a microphone and listening to a speaker that are attached to a second cable which is coupled to the cellular telephone/two-way radio. Alternatively, the microphone can be included in an enclosure with the button on the first cable. The method begins in step 3112 by pressing the button attached to the end of the first cable to instruct the cellular telephone/two-way radio to transmit in a half-duplex communications mode for a two-way radio conversation. Next, in step 3114 the user speaks within a detection range of the microphone that is attached to the second cable, while continuing to press the button attached to the end of the first cable, to transmit spoken information in the half-duplex communications mode in the two-way radio conversation. In step 3116, the user releases the button attached to the end of the first cable to instruct the cellular telephone/two-way radio to cease transmitting for the two-way radio conversation, and to permit the cellular telephone/two-way radio to receive in a half duplex communications mode for the two-way radio conversation so the user can hear a received transmission through the speaker attached to the second cable. In step 3118, the cellular telephone/two-way radio ceases transmitting or receiving in a half duplex communications mode for the two-way radio conversation. In step 3120, the user becomes cognizant of an indication that the cellular telephone/two-way radio is receiving an incoming cellular telephone call. Responsive to becoming cognizant of the indication that the cellular telephone/two-way radio is receiving an incoming cellular telephone call, in step 3122 the user presses the button attached to the end of the first cable, to instruct the cellular telephone/two-way radio to establish communications for a full duplex cellular telephone conversation.

THIRD EXAMPLE

Figure 32:
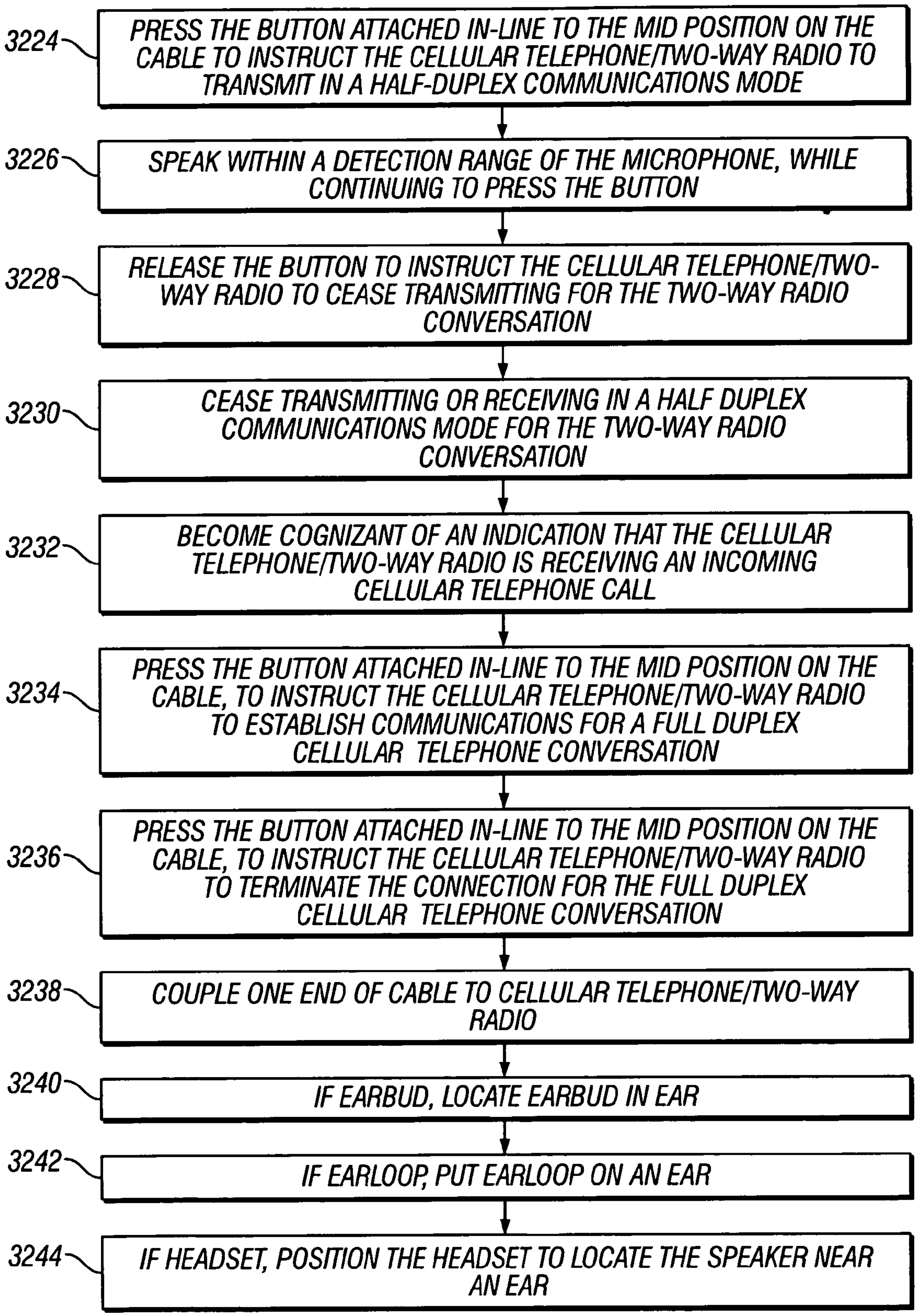
FIG. 32 is a flowchart of an operational sequence for operating a hands-free device with a cellular telephone/two-way radio in accordance with an illustrative embodiment of the invention.

Another example of the method aspect of the present invention is illustrated in FIG. 32. FIG. 32 shows a method for instructing a cellular telephone/two-way radio to transmit in a half duplex communications mode for a two-way radio conversation, and for instructing the cellular telephone/two-way radio to establish communications for a full duplex cellular telephone conversation, by pressing a button 132, 241 attached in-line to a mid position on a single cable 172, 265 which is coupled at one end to the cellular telephone/two-way radio, and which is also attached to a microphone 154, 255 and a speaker (for example included in earpiece 166, 259). The method begins in step 3224, by pressing the button 132, 241 attached in-line to the mid position on the cable 172, 265 to instruct the cellular telephone/two-way radio to transmit in a half-duplex communications mode for a two-way radio conversation. Next, in step 3226, the user speaks within a detection range of the microphone 154, 255, while continuing to press the button 132, 241 attached in-line to the mid position on the cable 172, 265, to transmit spoken information in the half-duplex communications mode in the two-way radio conversation. In step 3228, the user releases the button 132, 241 attached in-line to the mid position on the cable 172, 265 to instruct the cellular telephone/two-way radio to cease transmitting for the two-way radio conversation, and to permit the cellular telephone/two-way radio to receive in a half duplex communications mode for the two-way radio conversation so the user can hear a received transmission. In step 3230, the cellular telephone/two-way radio ceases transmitting or receiving in a half duplex communications mode for the two-way radio conversation. Next, in step 3232, the user becomes cognizant of an indication that the cellular telephone/two-way radio is receiving an incoming cellular telephone call. Finally, in step 3234, responsive to becoming cognizant of the indication that the cellular telephone/two-way radio is receiving an incoming cellular telephone call, the user presses the button 132, 241 attached in-line to the mid position on the cable 172, 265, to instruct the cellular telephone/two-way radio to establish communications for a full duplex cellular telephone conversation.

Optionally, in step 3236, the method also may include pressing the button 132, 241 attached in-line to the mid position on the cable 172, 265, to instruct the cellular telephone/two-way radio to terminate the connection for the full duplex cellular telephone conversation.

The method may also include the step 3238 of coupling one end of the single cable 172, 265 to a cellular telephone/two-way radio.

If the speaker is an earbud, the method may include locating the earbud in an ear, in step 3240. If the speaker is an earloop, the method may include putting the earloop on an ear, in step 3242. If the speaker is attached to a headset, the method may include positioning the headset to locate the speaker near an ear, in step 3244. If the speaker is attached to an acoustic tube, the method may include putting the end of the acoustic tube in an ear. The method may also be practiced with a submersible headset.

FOURTH EXAMPLE

Figure 33:
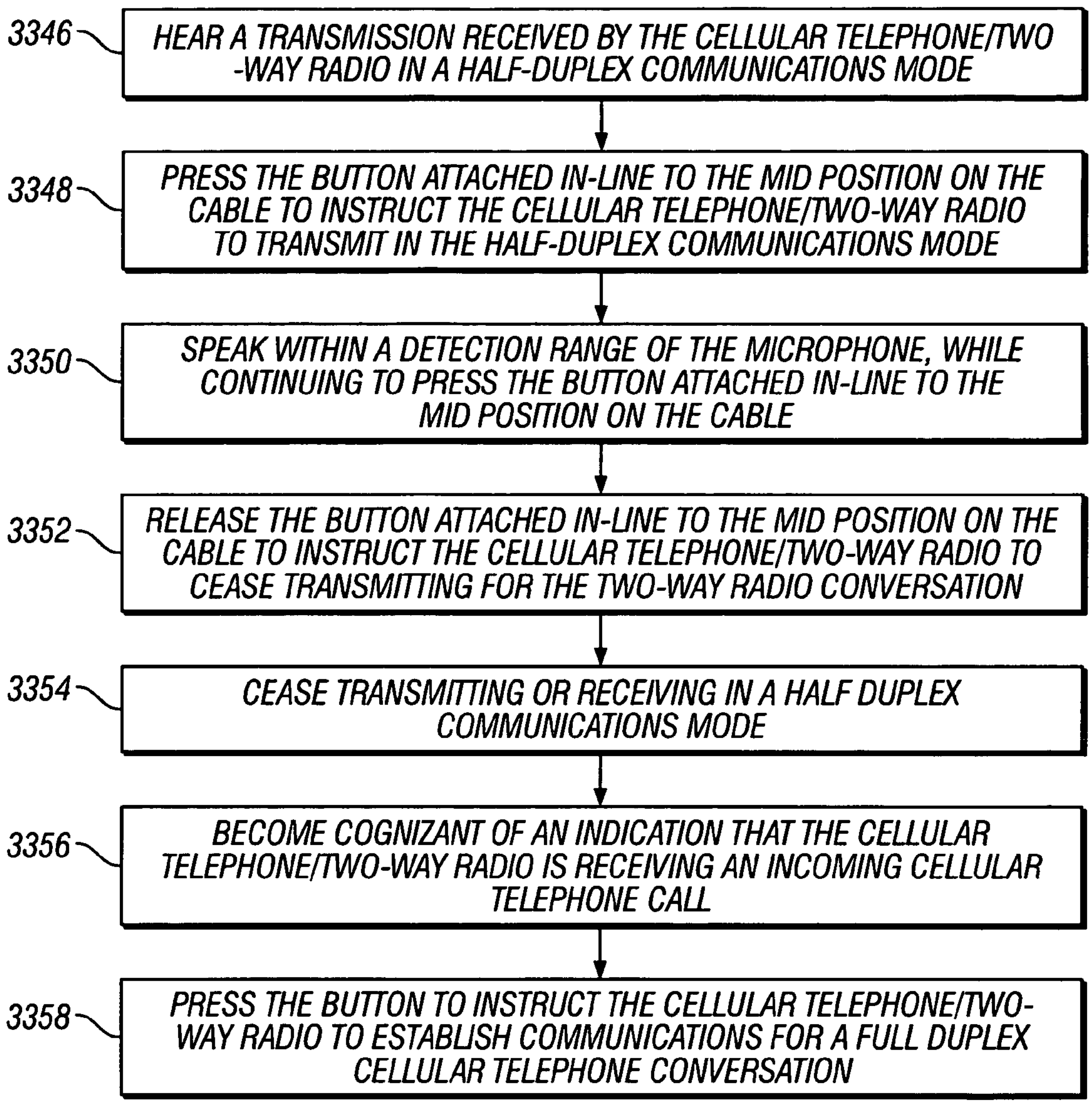
FIG. 33 is a flowchart of an operational sequence for operating a hands-free device with a cellular telephone/two-way radio in accordance with an illustrative embodiment of the invention.

Another example of the method aspect of the present invention is illustrated in FIG. 33. FIG. 33 shows a method for instructing a cellular telephone two-way radio to transmit in a half duplex communications mode for a two-way radio conversation, and for instructing the cellular telephone/two-way radio to establish communications for a full duplex cellular telephone conversation, by pressing a button 132, 241 attached in-line to a mid position on a single cable 172, 265 which is coupled at one end to the cellular telephone/two-way radio, and which is also attached to a microphone 154, 255 and a speaker (for example included in earpiece 166, 259). The method begins in step 3346, by hearing a transmission received by the cellular telephone/two-way radio in a half-duplex communications mode for a two-way radio conversation. Next, in step 3348, responsive to hearing the transmission, after the transmission has ended, the user presses the button 132, 241 attached in-line to the mid position on the cable 172, 265 to instruct the cellular telephone/two-way radio to transmit in the half-duplex communications mode for a two-way radio conversation. Next, in step 3350 the user speaks within a detection range of the microphone 154, 255, while continuing to press the button 132, 241 attached in-line to the mid position on the cable 172, 265, to transmit spoken information in the half-duplex communications mode in the two-way radio conversation. In step 3352, the user releases the button 132, 241 attached in-line to the mid position on the cable 172, 265 to instruct the cellular telephone/two-way radio to cease transmitting for the two-way radio conversation, and to permit the cellular telephone/two-way radio to again receive in the half duplex communications mode for the two-way radio conversation so the user can hear a received transmission. In step 3354, the cellular telephone/two-way radio ceases transmitting or receiving in a half duplex communications mode for the two-way radio conversation. Next, in step 3356, the user becomes cognizant of an indication that the cellular telephone/two-way radio is receiving an incoming cellular telephone call. Responsive to becoming cognizant of the indication that the cellular telephone/two-way radio is receiving an incoming cellular telephone call, in step 3358 the user presses the button 132, 241 attached in-line to the mid position on the cable 172, 265, to instruct the cellular telephone/two-way radio to establish communications for a full duplex cellular telephone conversation.

FIFTH EXAMPLE

Figure 34:
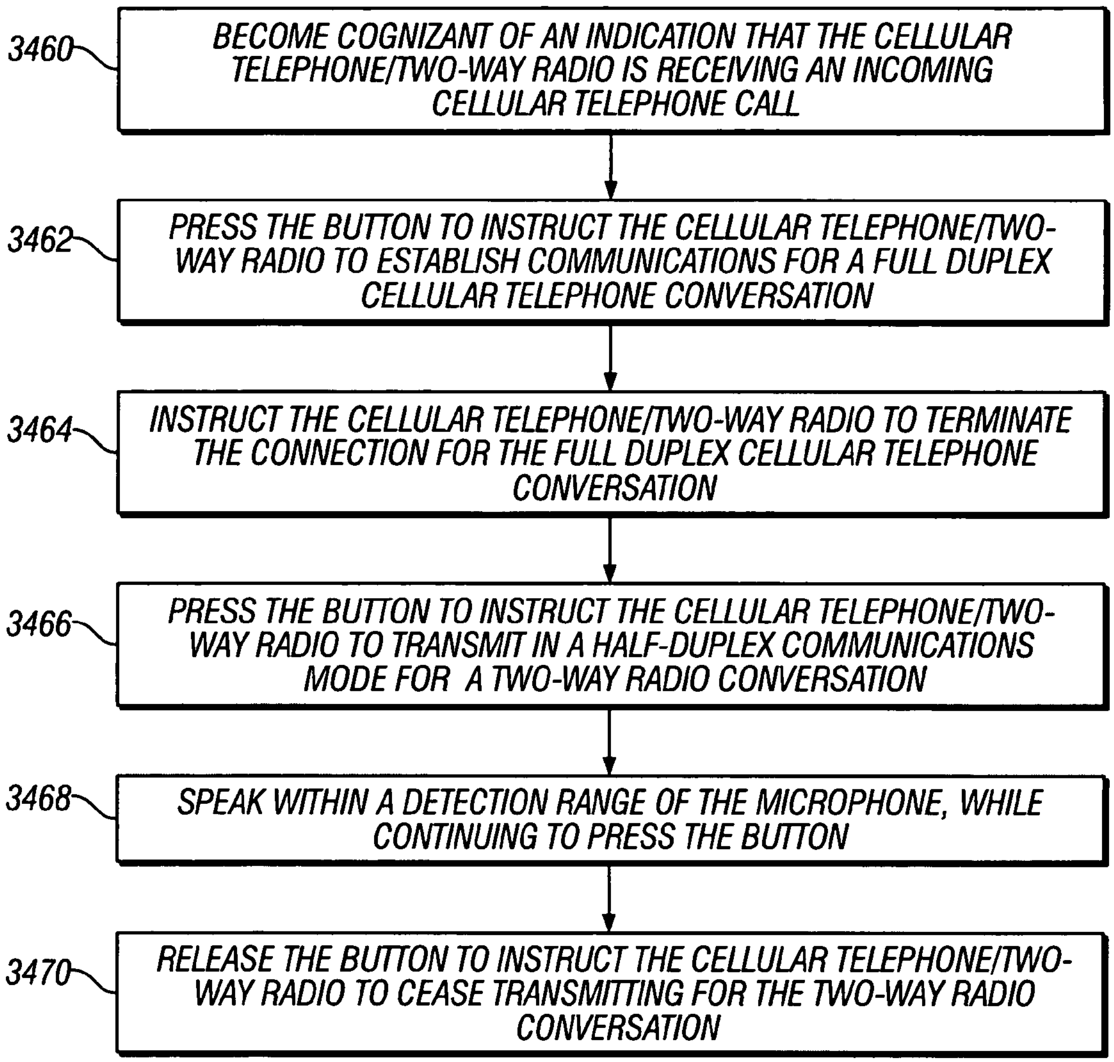
FIG. 34 is a flowchart of an operational sequence for operating a hands-free device with a cellular telephone/two-way radio in accordance with an illustrative embodiment of the invention.

Another example of the method aspect of the present invention is illustrated in FIG. 34. FIG. 34 shows a method for instructing a cellular telephone/two-way radio to establish communications for a full duplex cellular telephone conversation, and for instructing the cellular telephone/two-way radio to transmit in a half duplex communications mode for a two-way radio conversation, by pressing a button 132, 241 attached in-line to a mid position on a single cable 172,

265 which is coupled at one end to the cellular telephone/two-way radio, and which is also attached to a microphone 154, 255 and a speaker (for example included in earpiece 166, 259).

The method begins with step 3460, in which the user becomes cognizant of an indication that the cellular telephone/two-way radio is receiving an incoming cellular telephone call. Next, in step 3462, responsive to becoming cognizant of the indication that the cellular telephone/two-way radio is receiving an incoming cellular telephone call, the user presses the button 132, 241 attached in-line to the mid position on the cable 172, 265, to instruct the cellular telephone/two-way radio to establish communications for a full duplex cellular telephone conversation. In step 3464, the user instructs the cellular telephone/two-way radio to terminate the connection for the full duplex cellular telephone conversation. The user may instruct the cellular telephone/two-way radio to terminate the connection for the full duplex cellular telephone conversation by pressing the button 132, 241 attached in-line to the mid position on the cable 172, 265. In step 3466, the user presses the button 132, 241 attached in-line to the mid position on the cable 172, 265 to instruct the cellular telephone/two-way radio to transmit in a half-duplex communications mode for a two-way radio conversation. In step 3468 the user speaks within a detection range of the microphone 154, 255, while continuing to press the button 132, 241 attached in-line to the mid position on the cable 172, 265, to transmit spoken information in the half-duplex communications mode in the two-way radio conversation. Next, in step 3470, the user releases the button 132, 241 attached in-line to the mid position on the cable 172, 265 to instruct the cellular telephone/two-way radio to cease transmitting for the two-way radio conversation, and to permit the cellular telephone/two-way radio to receive in a half duplex communications mode for the two-way radio conversation so the user can hear a received transmission.

SIXTH EXAMPLE

Figure 35:
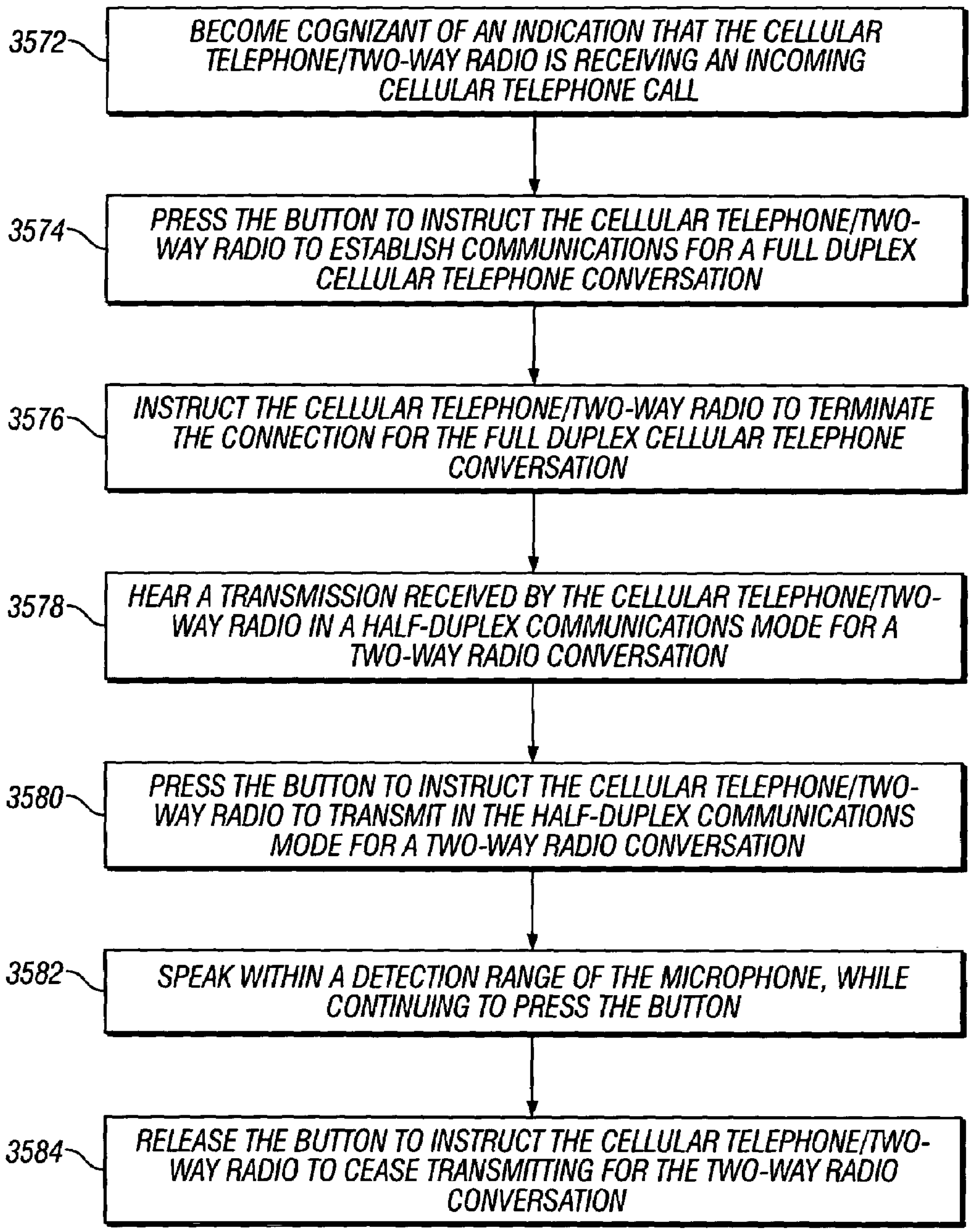
FIG. 35 is a flowchart of an operational sequence for operating a hands-free device with a cellular telephone/two-way radio in accordance with an illustrative embodiment of the invention.

Another example of the method aspect of the present invention is illustrated in FIG. 35. FIG. 35 shows a method for instructing a cellular telephone/two-way radio to establish communications for a full duplex cellular telephone conversation, and for instructing the cellular telephone/two-way radio to transmit in a half duplex communications mode for a two-way radio conversation, by pressing a button 132, 241 attached in-line to a mid position on a single cable 172, 265 which is coupled at one end to the cellular telephone/two-way radio, and which is also attached to a microphone 154, 255 and a speaker (for example included in earpiece 166, 259). The method begins with step 3572, in which the user becomes cognizant of an indication that the cellular telephone/two-way radio is receiving an incoming cellular telephone call. In step 3574, responsive to becoming cognizant of the indication that the cellular telephone/two-way radio is receiving an incoming cellular telephone call, the user presses the button 132, 241 attached in-line to the mid position on the cable 172, 265, to instruct the cellular telephone/two-way radio to establish communications for a full duplex cellular telephone conversation. Next, in step 3576, the user instructs the cellular telephone/two-way radio to terminate the connection for the full duplex cellular telephone conversation. In step 3578, the user hears a transmission received by the cellular telephone/two-way radio in a half-duplex communications mode for a two-way radio conversation. Responsive to hearing the transmission, after the transmission has ended, in step 3580 the user presses the button 132, 241 attached in-line to the mid position on the cable 172, 265 to instruct the cellular telephone/two-way radio to transmit in the half-duplex communications mode for a two-way radio conversation. In step 3582, the user speaks within a detection range of the microphone 154, 255, while continuing to press the button 132, 241 attached in-line to the mid position on the cable 172, 265, to transmit spoken information in the half-duplex communications mode in the two-way radio conversation. The user releases the button 132, 241 attached in-line to the mid position on the cable 172, 265 in step 3584, to instruct the cellular telephone/two-way radio to cease transmitting for the two-way radio conversation, and to permit the cellular telephone/two-way radio to receive in a half duplex communications mode for the two-way radio conversation so the user can hear a received transmission.

SEVENTH EXAMPLE

Figure 36:
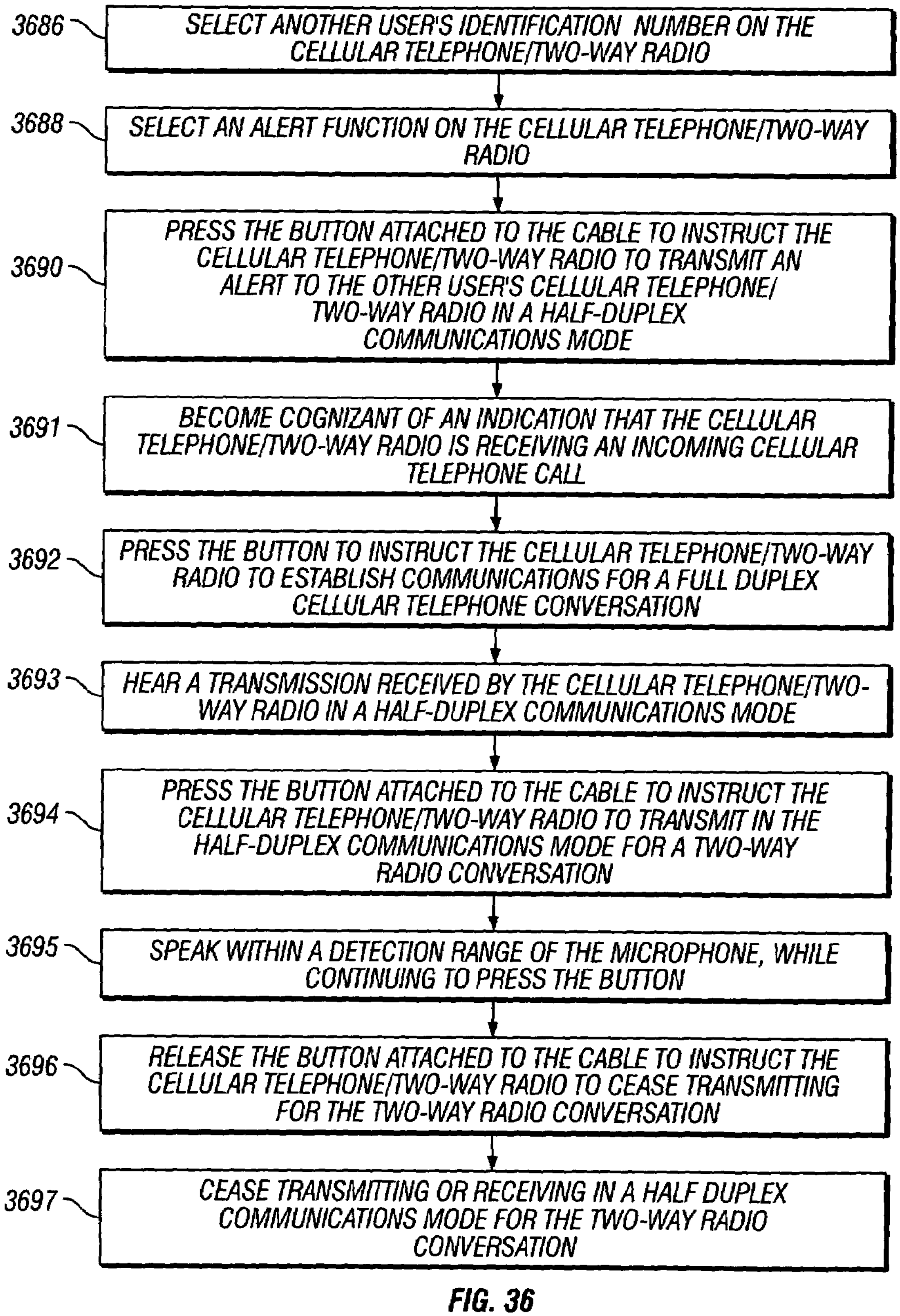
FIG. 36 is a flowchart of an operational sequence for operating a hands-free device with a cellular telephone/two-way radio in accordance with an illustrative embodiment of the invention.

Another example of the method aspect of the present invention is illustrated in FIG. 36. FIG. 36 shows a method for instructing a cellular telephone/two-way radio to transmit an alert in a half duplex communications mode, and for instructing the cellular telephone/two-way radio to establish communications for a full duplex cellular telephone conversation, by pressing a button 132, 241 attached to a cable 172, 265 which is coupled at one end to the cellular telephone/two-way radio, and which is also attached to a microphone 154, 255 and a speaker (for example included in earpiece 166, 259). The method begins with step 3686, in which a user selects another user's identification number on the cellular telephone/two-way radio. In step 3688, the user selects an alert function on the cellular/telephone/two-way radio. In step 3690, the user presses the button 132, 241 attached to the cable 172, 265 to instruct the cellular telephone/two-way radio to transmit an alert to the other user's cellular telephone/two-way radio in a half-duplex communications mode. Next, in step 3691, the user becomes cognizant of an indication that the cellular telephone/two-way radio is receiving an incoming cellular telephone call. Responsive to becoming cognizant of the indication that the cellular telephone/two-way radio is receiving an incoming cellular telephone call, in step 3692 the user presses the button 132, 241 to instruct the cellular telephone/two-way radio to establish communications for a full duplex cellular telephone conversation. Optionally, this method also includes the following steps. In step 3693 the user hears a transmission received by the cellular telephone/two-way radio in a half-duplex communications mode for a two-way radio conversation. In step 3694, responsive to hearing the transmission, after the transmission has ended, the user presses the button 132, 241 attached to the cable 172, 265 to instruct the cellular telephone/two-way radio to transmit in the half-duplex communications mode for a two-way radio conversation. In step 3695, the user speaks within a detection range of the microphone 154, 255, while continuing to press the button 132, 241 attached to the cable 172, 265, to transmit spoken information in the half-duplex communications mode in the two-way radio conversation. In step 3696, the user releases the button 132, 241 attached to the cable 172, 265 to instruct the cellular telephone/two-way radio to cease transmitting for the two-way radio conversation, and to permit the cellular telephone/two-way radio to again receive in the half duplex communications mode for the two-way radio conversation so the user can hear a received transmission. In step 3697, the cellular telephone/two-way radio ceases transmitting or receiving in a half duplex communications mode for the two-way radio conversation.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

TABLE 1

Figure 3A:
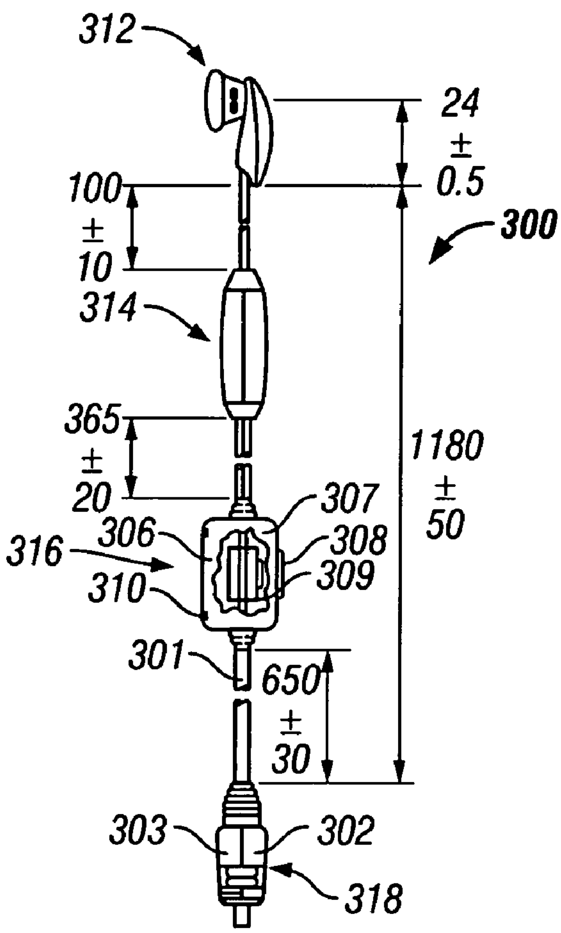
FIG. 3A is a plan view of a hands-free device in accordance with an illustrative embodiment of the invention.
Figure 3B:
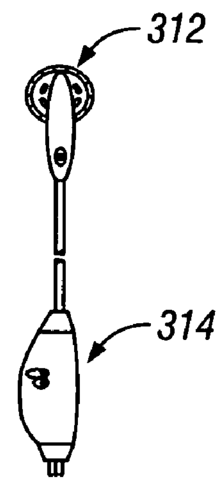
FIGS. 3B, 3C, 3D, and 3E are views of portions of a hands-free device in accordance with an illustrative embodiment of the invention.
Figure 3C:
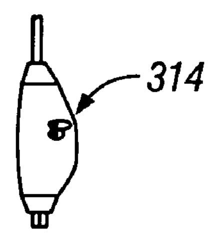
Figure 3D:
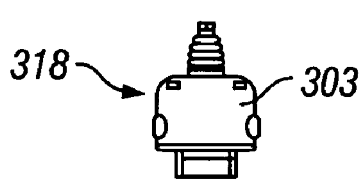
Figure 3E:
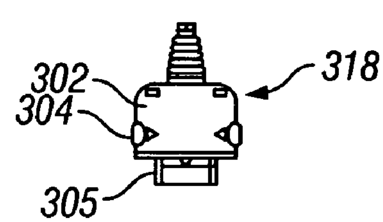

This table contains information concerning FIGS. 3A-B-C-D-E.
ASSEMBLY DRAWING OF PRODUCT

| NO. | PART NAME | DESCRIPTION | COLOR |
|---|---|---|---|
| 310 | SCREW | 2/ 2 × 8 | BLACK |
| 309 | TACT S/W | DT-1105 | |
| 308 | PTT. S/W KNOB | ABS | BLACK |
| 307 | PTT. UPPER CASE | ABS | BLACK |
| 306 | PTT. BOTTOM CASE | ABS | BLACK |
| 305 | CONNECTOR | | BLACK |
| 304 | BUTTEN | ABS | BLACK |
| 303 | CON. BOTTOM CASE | ABS | BLACK |
| 302 | CON. UPPER CASE | ABS | BLACK |
| 301 | WIRE | PUR 50%, Ø 1.6 × 2 | NON-VEERING (BLACK) |
| 300 | HANDS-FREE DEVICE | | |
| 312 | EARBUD HOUSING | | |
| 314 | MICROPHONE CASE | | |
| 316 | SWITCH CASE | | |
| 318 | PLUG ASSEMBLY | | |

TABLE 2

Figure 4A:
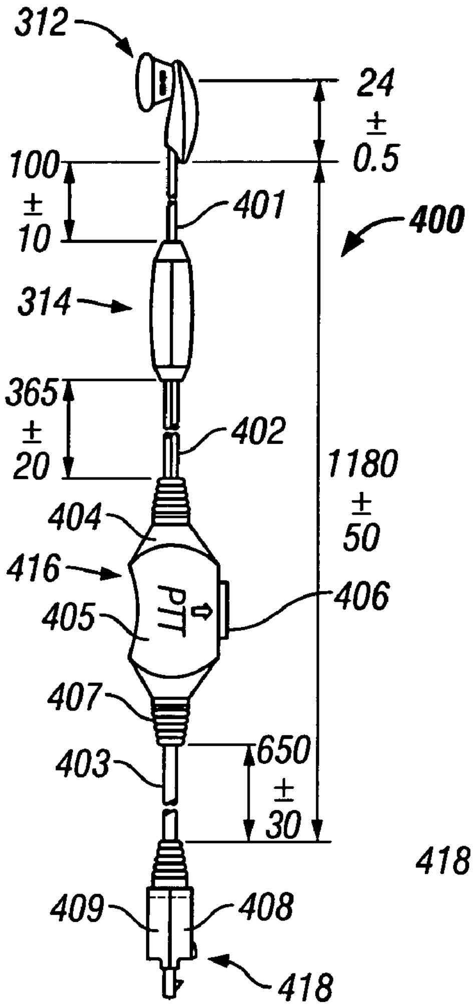
FIG. 4A is a plan view of a hands-free device in accordance with an illustrative embodiment of the invention.
Figure 4B:
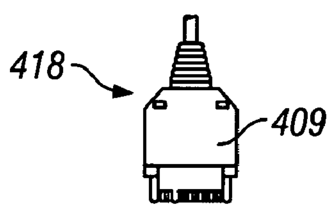
FIGS. 4B and 4C are views of a plug assembly of a hands-free device in accordance with an illustrative embodiment of the invention.
Figure 4C:
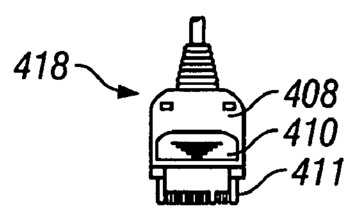
Figure 5:
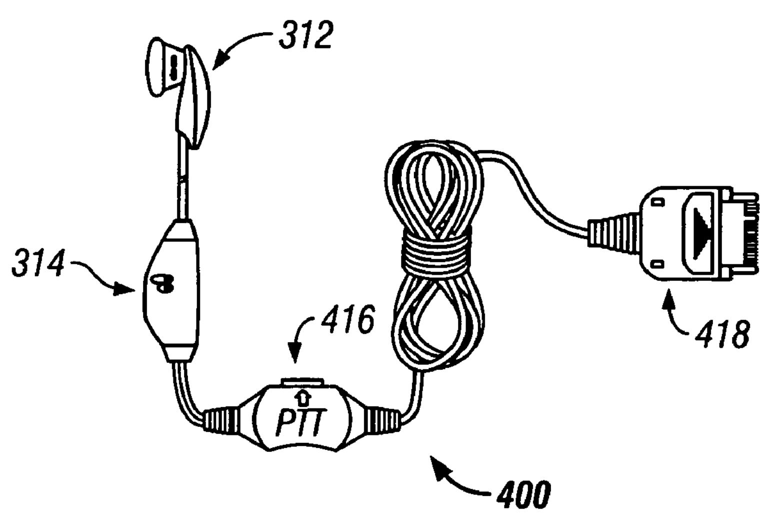
FIG. 5 is an plan view of a hands-free device in accordance with an illustrative embodiment of the invention.

This table contains information concerning FIGS. 4A-B-C.
ASSEMBLY DRAWING OF PRODUCT

| NO. | PART NAME | DESCRIPTION | COLOR |
|---|---|---|---|
| 411 | CONNECTOR | ABS | BLACK |
| 410 | BUTTEN | ABS | BLACK |
| 409 | CON. BOTTOM CASE | ABS | BLACK |
| 408 | CON. UPPER CASE | ABS | BLACK |
| 407 | MOLD | | BLACK |
| 406 | PTT. S/W KNOB | ABS | BLACK |
| 405 | PTT. BOTTOM CASE | ABS | BLACK |
| 404 | PTT. UPPER CASE | ABS | BLACK |
| 403 | WIRE | PVC 85%, Ø 2.7 | BLACK |
| 402 | WIRE | PUR 50%, Ø 1.6 × 2 | NON-VEERING (BLACK) |
| 401 | WIRE | PUR 50%, Ø 1.6 | NON-VEERING (BLACK) |
| 400 | HANDS-FREE DEVICE | | |
| 416 | SWITCH CASE | | |
| 418 | PLUG ASSEMBLY | | |

TABLE 3

Figure 6:
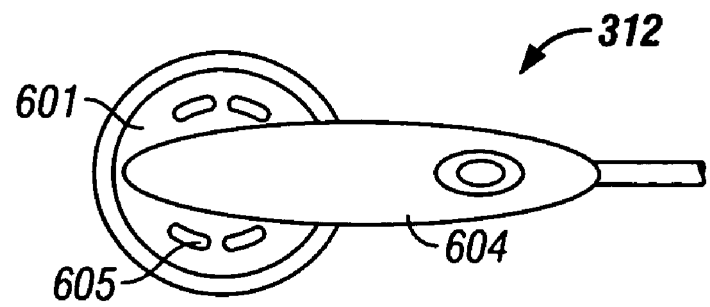
FIG. 6 is a rear view of an earbud housing in accordance with an illustrative embodiment of the invention.
Figure 7:
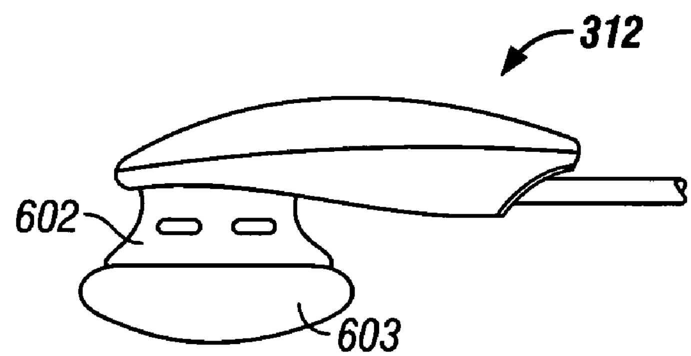
FIG. 7 is a side view of an earbud housing in accordance with an illustrative embodiment of the invention.

This table contains information concerning FIGS. 6 and 7.
ASSEMBLY DRAWING OF HOUSING PART

| NO. | PART NAME | DESCRIPTION | COLOR |
|---|---|---|---|
| 605 | H/DAMPER | COMPRESSED URETHANE | BLACK |
| 604 | HOUSING COVER | ABS | SILVER (SPRAY) |
| 603 | RUBBER RING | NV70 | BLACK |
| 602 | HOUSING | ABS | SILVER (SPRAY) |
| 601 | UNIT ASSY | 9$\mu$, 32 Ω | NATURAL |

TABLE 4

Figure 8:
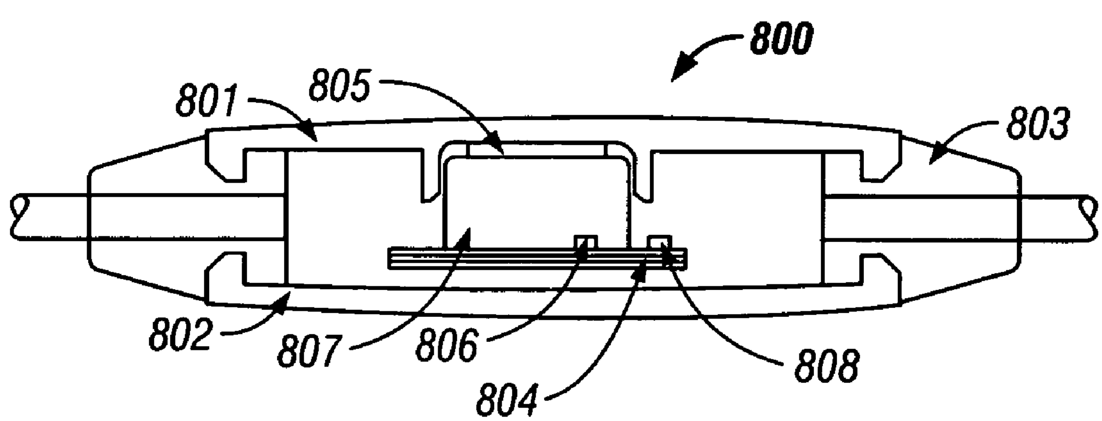
FIG. 8 is a sectional view of a module containing a microphone and a PTT button, in accordance with an illustrative embodiment of the invention.

This table contains information concerning FIG. 8.
ASSEMBLY DRAWING OF REMOTE CONTROLLER PART (PTT)

| NO. | PART NAME | DESCRIPTION | COLOR |
|---|---|---|---|
| 808 | NOT | NOT | NOT |
| 807 | CONDENSER MIC | OB-27P40 | NATURAL |
| 806 | ZENER DIODE | 12 V | NATURAL |
| 805 | DAMPER | COMPRESSED URETHANE | BLACK |
| 804 | PCB SET | FR-4 t = 0.6 | NATURAL |
| 803 | BUSHING | P.V.C 70% | BLACK |
| 802 | BOTTOM CASE | ABS #380 | BLACK |
| 801 | UPPER CASE | ABS #380 | BLACK |
| 800 | MICROPHONE/ PTT BUTTON MODULE | | |
| Alternative description of components in FIG. 8: | | | |
| 808 | CAPACITOR | 5pF | |
| 807 | CONDENSER MIC | OB-27P44 | |
| 806 | ZENER DIODE | 12 V | |

TABLE 5

Figure 9:
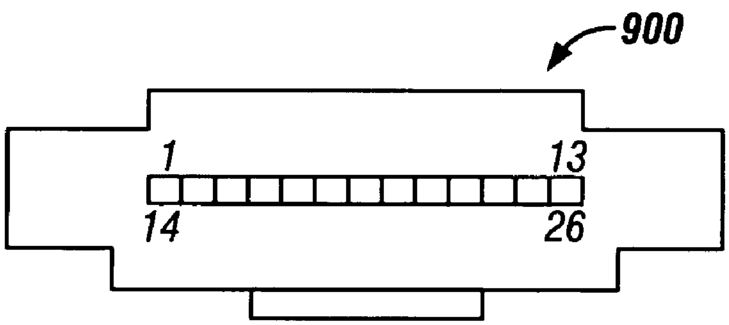
FIG. 9 is a side elevation of a plug assembly in accordance with an illustrative embodiment of the invention.

This table contains information concerning FIG. 9.
Plug assembly 900 is shown in FIG. 9.
–I1000 PIN DATA

| NO. | PIN NO. | PIN DATA | DESCRIPTION |
|---|---|---|---|
| 1 | 11 | 2-WAY KEY | PULL DOWN (0 Ω~7.5 KΩ) 0 Ω PULL DOWN CURRENT 135 $\mu$A |
| 2 | 12 | RX SIGNAL | 2 WAY KEY TONE VOL MAX 890 Hz, 85 mVr |
| 3 | 13 | GND | 1, 3.5, 16, 26 |
| 4 | 14 | VCC | DC 2.9 V |
| 5 | 24 | MODE | PULL DOWN (0 Ω~100 Ω) 0 Ω PULL DOWN CURRENT 145 $\mu$A |
| 6 | 25 | TX | |

TABLE 6

Figure 10:
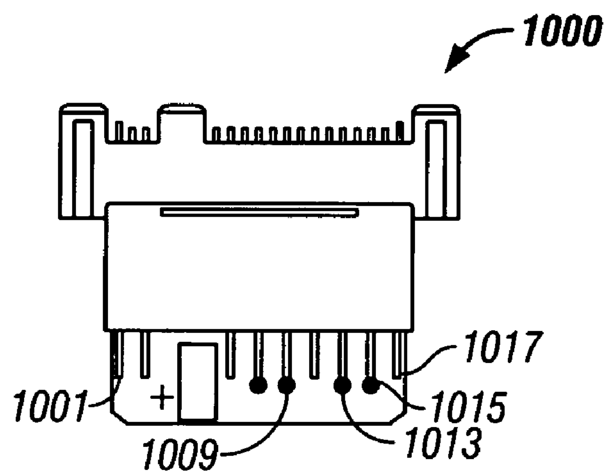
FIG. 10 is a front view of a plug assembly in accordance with an illustrative embodiment of the invention.
Figure 11:
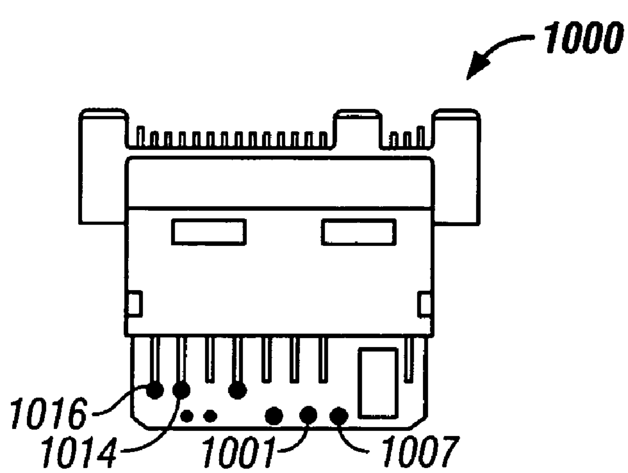
FIG. 11 is a back view of a plug assembly in accordance with an illustrative embodiment of the invention.

This table contains information concerning FIGS. 10 and 11.
Plug assembly 1000 is shown in FIGS. 10 and 11.

| NO. | PIN NO. | DATA | DESCRIPTION | COLOR |
|---|---|---|---|---|
| iden 50/85/90 PIN DATA | | | | |
| 1 | 1 | A. GND | | BLACK(SHIELD), RED |
| 2 | 7 | POWER | | YELLOW |
| 3 | 9 | VCC | | WHITE |
| 4 | 13 | PTT | | BLACK |
| 5 | 14 | MODE | GND SHORT | |
| 6 | 15 | AUDIO OUT | RX | GREEN(SHIELD) |
| 7 | 16 | AUDIO IN | TX | RED(SHIELD) |
| 8 | 17 | GND | | NATURAL(SHIELD) |
| iden CONDOR 50/85/90 PIN DATA | | | | |
| 1 | 1 | A. GND | Analog ground | BLACK(SHIELD), RED |
| 2 | 7 | VCC1 | DC 3.6 V (±0.4 V) | YELLOW |
| 3 | 9 | VCC2 | DC 2.8 V | WHITE |
| 4 | 13 | PTT | | BLACK |
| 5 | 14 | MODE | Gnd short | |
| 6 | 15 | AUDIO OUT | RX | GREEN(SHIELD) |
| 7 | 16 | AUDIO IN | TX | RED(SHIELD) |
| 8 | 17 | GND | Ground | NATURAL(SHIELD) |

TABLE 7

Figure 12:
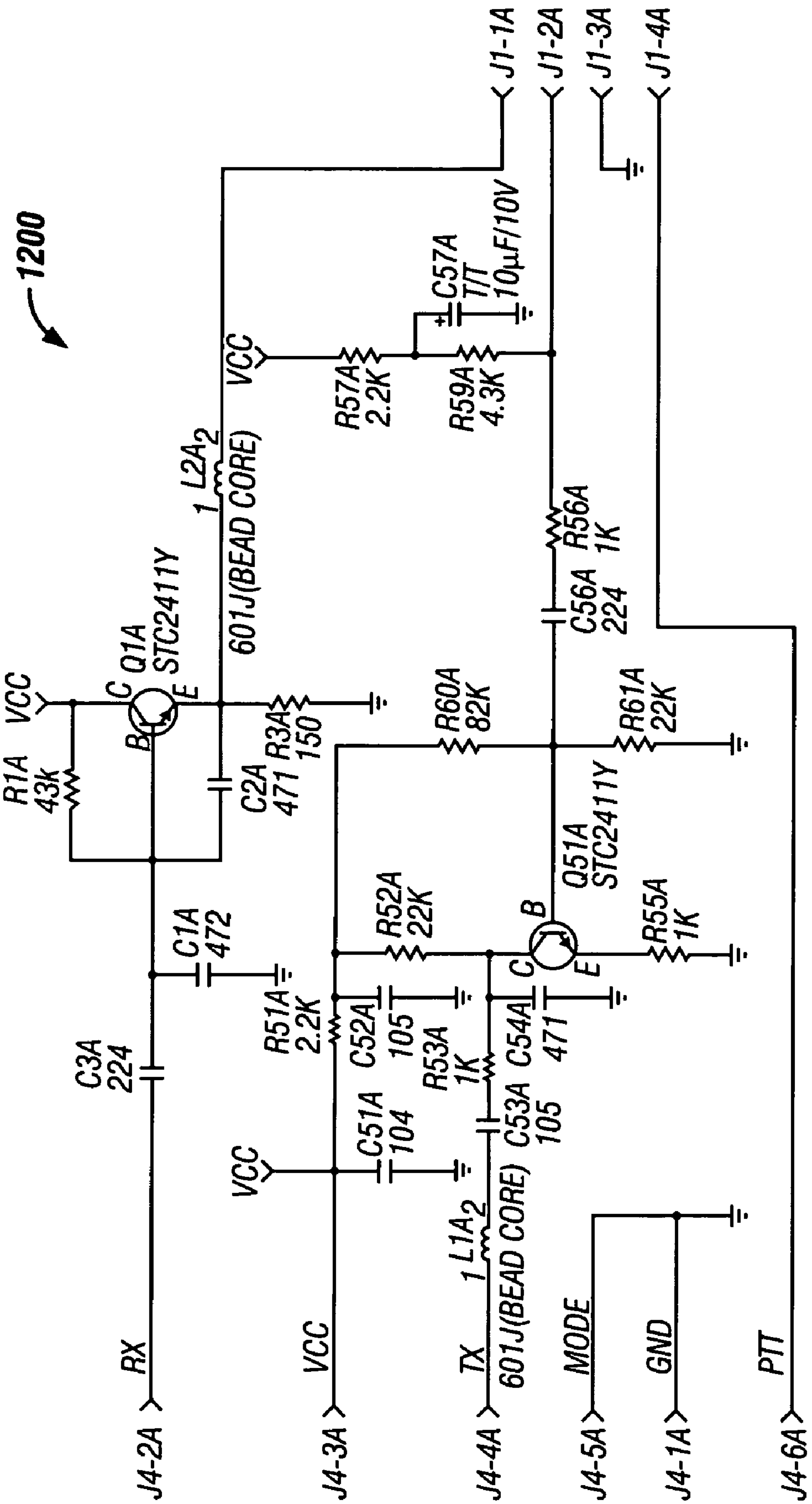
FIG. 12 is a schematic diagram of a plug assembly circuit board in accordance with an illustrative embodiment of the invention.

This table contains information concerning FIG. 12.
PORTABLE H/F
MOTOROLA iden 500/700/1000
A schematic diagram of a plug assembly circuit board 1200 is shown in FIG. 12.
List of components in FIG. 12:

| |
|---|
| C3A |
| R1A |
| C1A |
| C2A |
| Q1A |
| R3A |
| L2A |
| C51A |
| R51A |
| C52A |
| R52A |
| R60A |
| L1A |
| C53A |
| R53A |
| C54A |
| Q51A |
| R55A |
| R61A |
| C56A |
| R56A |
| R57A |
| R59A |
| C57A |
| J1-1A |
| J1-2A |
| J1-3A |
| J1-4A |
| J4-2A |
| J4-3A |
| J4-4A |
| J4-5A |
| J4-1A |
| J4-6A |

TABLE 8

Figure 13:
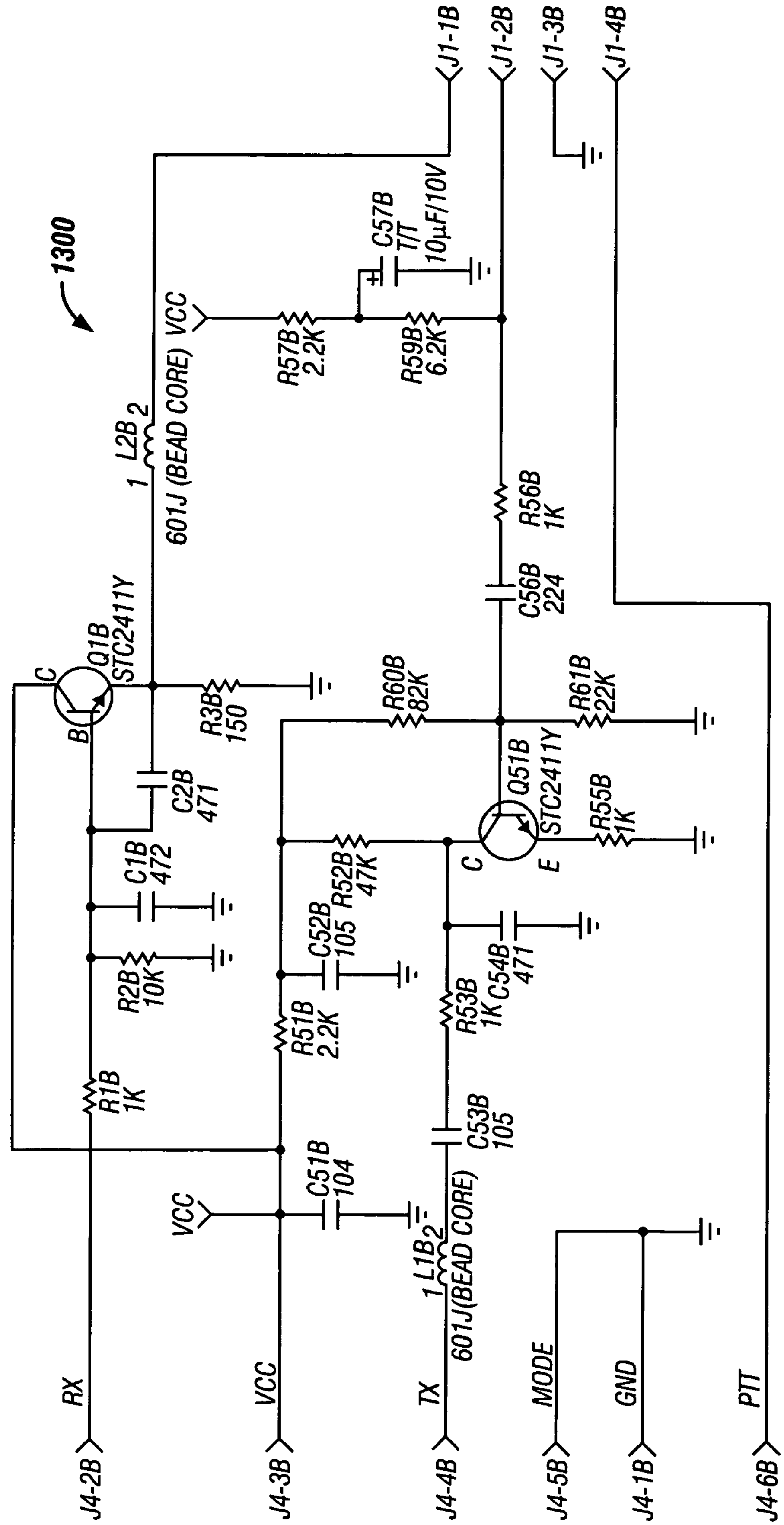
FIG. 13 is a schematic diagram of a plug assembly circuit board in accordance with an illustrative embodiment of the invention.

This table contains information concerning FIG. 13.
Schematic illustration of model # K1000-pi.
PORTABLE H/F
MOTOROLA iden 500/700/1000
A schematic diagram of a plug assembly circuit board 1300 is shown in FIG. 13.
List of components in FIG. 13:

| |
|---|
| R1B |
| R2B |
| C1B |
| C2B |
| Q1B |
| R3B |
| L2B |
| C51B |
| R51B |
| C52B |
| R52B |
| R60B |
| L1B |
| C53B |
| R53B |
| C54B |
| Q51B |
| R55B |
| R61B |
| C56B |
| R58B |
| R57B |
| R59B |
| C57B |
| J1-1B |
| J1-2B |
| J1-3B |
| J1-4B |
| J4-2B |
| J4-3B |
| J4-4B |
| J4-5B |
| J4-1B |
| J4-6B |

TABLE 9

This table contains information concerning FIGS. 14A–B.
iden 50/85/90
A schematic diagram of an interface circuit board 1400 is shown in FIGS. 14A–B.
List of components in FIGS. 14A–B:

| |
|---|
| C1C |
| R1C |
| C18C |
| R3C |
| C101C |
| C11C |
| C12C |
| R11C |
| C13C |
| R12C |
| C14C |
| C15C |
| C17C |
| U2C |
| R13C |
| C19C |
| C16C |
| C2C |
| ZD1C |
| R15C |
| R16C |
| C5C |
| C6C |
| L1C |
| C7C |
| R101C |

TABLE 9-continued

| This table contains information concerning FIGS. 14A–B.<br>iden 50/85/90<br>A schematic diagram of an interface circuit board 1400 is shown in FIGS. 14A–B.<br>List of components in FIGS. 14A–B: |
|---|
| R107C |
| D102C |
| R102C |
| U1BC |
| D101C |
| C102C |
| R103C |
| Q101C |
| R104C |
| C103C |
| U101C |
| R106C |
| R105C |
| ZD2C |
| SW1C |
| C51C |
| ZD51C |
| U1CC |
| C56C |
| C4C |
| R2C |
| R52C |
| R53C |
| C53C |
| C8C |
| C52C |
| R51C |
| U1AC |
| C58C |
| R55C |
| C54C |
| R56C |
| R57C |
| C55C |
| C57C |
| V1C |
| MIC1C |
| J2-6C |
| J2-2C |
| J2-9C |
| J2-1C |
| J2-5C |
| J2-7C |
| J2-3C |
| J2-4C |
| J1-1C |
| J1-2C |
| J1-3C |
| J1-4C |
| J1-5C |
| J1-6C |

TABLE 10

| This table contains information concerning FIGS. 15A–B.<br>iden 50/85/90<br>MAIN PCB PART<br>A schematic diagram of an interface circuit board 1500 is shown in FIGS. 15A–B.<br>List of components in FIGS. 15A–B: |
|---|
| C18D |
| R3D |
| C11D |
| C101D |
| C12D |
| R11D |
| L11D |
| C13D |
| R12D |

TABLE 10-continued

| This table contains information concerning FIGS. 15A–B.<br>iden 50/85/90<br>MAIN PCB PART<br>A schematic diagram of an interface circuit board 1500 is shown in FIGS. 15A–B.<br>List of components in FIGS. 15A–B: |
|---|
| C14D |
| C15D |
| C17D |
| U2D |
| R13D |
| C19D |
| C16D |
| C2D |
| ZD1D |
| R15D |
| R16D |
| C5D |
| C6D |
| L1D |
| C7D |
| R107D |
| R101D |
| D102D |
| R102D |
| U1BD |
| D101D |
| C102D |
| R103D |
| Q101D |
| R104D |
| C103D |
| U101D |
| R106D |
| R105D |
| ZD51D |
| C51D |
| C56D |
| UICD |
| C4D |
| R2D |
| R52D |
| R54D |
| R53D |
| C53D |
| C8D |
| C52D |
| R51D |
| U1AD |
| C58D |
| R55D |
| C54D |
| R56D |
| R57D |
| C55D |
| C57D |

TABLE 11

Figure 16:
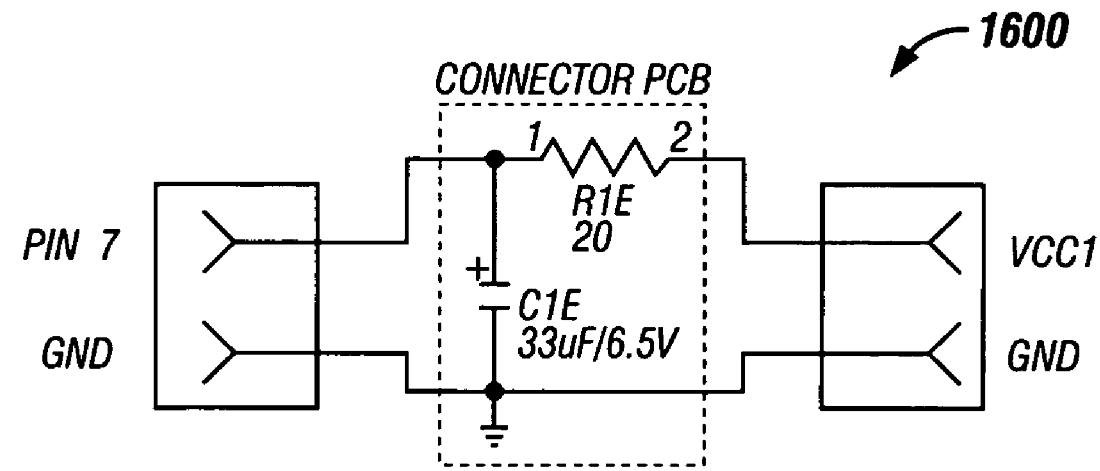
FIG. 16 is a schematic diagram of a connector circuit board in accordance with an illustrative embodiment of the invention.

| |
|---|
| This table contains information concerning FIG. 16. A schematic diagram of a connector circuit board 1600 is shown in FIG. 16. List of components in FIG. 16: |
| R1E |
| C1E |

TABLE 12

Figure 17:
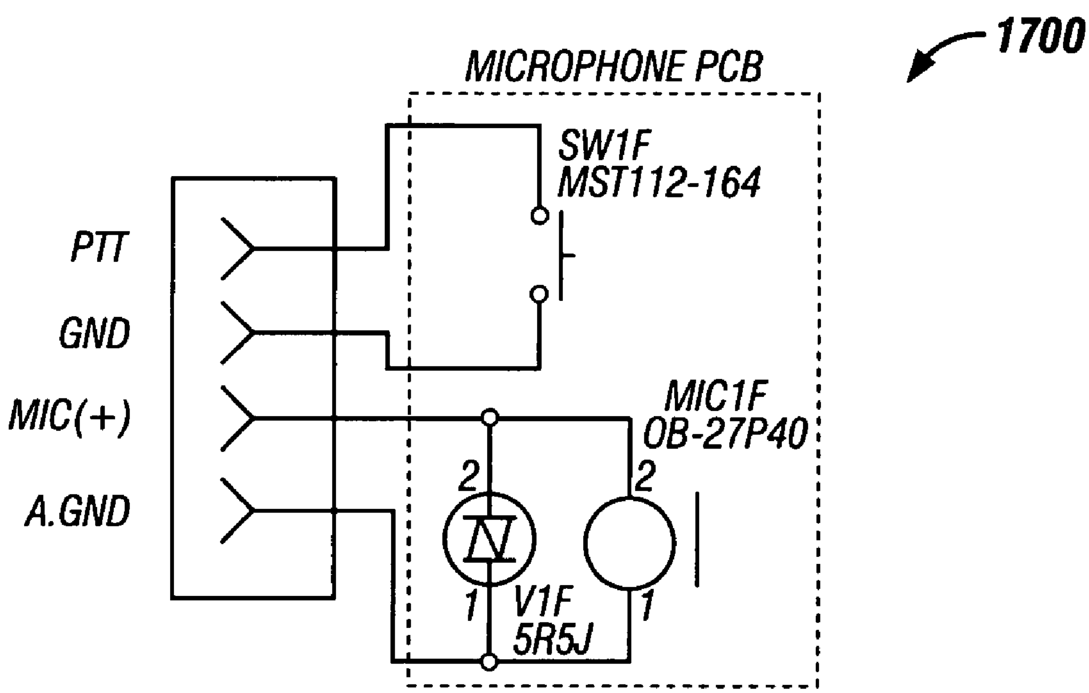
FIG. 17 is a schematic diagram of a microphone and switch circuit board in accordance with an illustrative embodiment of the invention.

| |
|---|
| This table contains information concerning FIG. 17. A schematic diagram of a microphone and switch circuit board 1700 is shown in FIG. 17. List of components in FIG. 17: |
| SW1F |
| V1F |
| MIC1F |

TABLE 13

This table contains information concerning a hands-free device in accordance with an illustrative embodiment of the invention.

1. BASIC CHARACTERISTIC
   - 1-1 RX CHARACTERISTIC
     - RX INPUT: FREQUENCY: 890 Hz
       SIGNAL: 85 mVr (RL: 32 Ω)
     - RX OUTPUT: 45 mVr
     - RX GAIN: −5.54 dB
   - 1-2 TX CHARACTERISTIC
     - TX INPUT: FREQUENCY: 1 KHz
       SIGNAL: 11 mVr SINE WAVE
     - TX OUTPUT :140 mVr (RL: OPEN)
       :14 mVr (RL: MOBIL)
     - TX GAIN :22 dB
       :2.1 dB
     - BW: 45 Hz~11 KHz
   - 1-3 PTT CHARACTERISTIC
     - VOLTAGE: 3 V (S/W OPEN)
     - CURRENT: 135 μA (S/W SHORT/GND)
   - 1-4 MODE CONVERSION (EAM MIC MODE)
     - PULL DOWN
     - CURRENT: 145 μA
2. APPLICATION RANGE
   This specification will be adapted to hands free earphone mic set with remote control.
3. CONCEPTION GOODS
   - 3-1 Item Name: HANDS FREE EARPHONE MIC SET
   - 3-2 Rated Input Power: 3 mW (0.31 V)
   - 3-3 Max. Allowed Input Power: 20 mW (0.8 V)
   - 3-4 Impedance: 32 Ω ± 4.8 Ω
   - 3-5 CORD Length: Refer to attached
   - 3-6 Weight :24 g ± 3 g (Cord weight included earphone mic set)
     :58 g ± 5 g (Blister weight included)
4. APPEARANCE
   - 4-1 There shall be no badness on appearance and dimension such as buzz, coating etc.
5. ELECTRICAL CHARACTERISTICS (EARPHONE SIDE)
   It should be applied EIAJ RC-7502 not in case of special designation.
   - 5-1 Function Test
     The signal shall be sine wave, and there shall be no malfunction on tone quality, volume and noise after added 3 mW (0.31 V) of input power with earphone.
   - 5-2 Nominal Impedance
     Impedance would be 35 Ω ± 5.25 Ω include cord resistance when measured by the method of resistance replacement after added 1,000 Hz (0.179 V) of sine wave. When objection occurred on judgment, judge by replace with 20 □.
   - 5-3 Max. INPUT Power: 20 mW (0.8 V)
     There shall be no abnormality with 1 mW of input power make white noise of maximum input power on for a minute, TABLE 13-continued This table contains information concerning a hands-free device in accordance with an illustrative embodiment of the invention.

and off 2 minutes for ten times repeat through the feeder designated by EIAJ.

TABLE 14

This table contains information concerning a hands-free device in accordance with an illustrative embodiment of the invention.

1. BASIC CHARACTERISTIC
   - 1-1 RX CHARACTERISTIC
     - RX GAIN: −16.50 dB (RL: 32 Ω)
       0 dB (RL: OPEN)
   - 1-2 TX CHARACTERISTIC
     - TX INPUT: FREQUENCY: 1 KHz
       SIGNAL: 11.2 mVr SINE WAVE
     - TX OUTPUT :330 mVr (RL: OPEN)
       :330 mVr (RL: MOBIL)
     - TX GAIN: 29.4 dB
     - BW: 120 Hz~4.3 KHz
   - 1-3 PTT CHARACTERISTIC
     - VOLTAGE: 2.7 V (S/W OPEN)
     - CURRENT: 67.5 μA (S/W SHORT/GND)
   - 1-4 MODE CONVERSION (PORTABLE H/F MODE)
     - PULL DOWN
     - CURRENT: 70 μA
2. APPLICATION RANGE
   This specification will be adapted to hands free earphone microphone set with remote PTT control.
3. CONCEPTION GOODS
   - 3-1 Item Name: HANDS FREE EARPHONE MIC SET
   - 3-2 Rated Input Power: 3 mW (0.31 V)
   - 3-3 Max. Allowed Input Power: 20 mW (0.8 V)
   - 3-4 Impedance: 32 Ω ± 4.8 Ω
   - 3-5 CORD Length: Refer to attached
   - 3-6 Weight: 33 g ± 3 g (Cord weight included earphone mic set)
4. APPEARANCE
   - 4-1 Aesthetics shall be without blemish.
5. ELECTRICAL CHARACTERISTICS (EARPHONE SIDE)
   It should be applied EIAJ RC-7502 not in case of special designation.
   - 5-1 Function Test
     The signal shall be sine wave, and there shall be no malfunction on tone quality. Reverb, volume and noise after added 3 mW (0.31 V) of input power with earphone shall be clear and without feedback, as diagnosed by X-trac meter.
   - 5-2 Nominal Impedance
     Impedance would be 35 Ω ± 5.25 Ω include cord resistance when measured by the method of resistance replacement after added 1,000 Hz (0.179 V) of sine wave. When objection occurred on judgment, replace with 20 □.
   - 5-3 Max. INPUT Power: 20 mW (0.8 V)
     There shall be no abnormality with 1 mW of input power make white noise of maximum input power on for a minute, and off 2 minutes for ten times. Repeat through the feeder designated by EIAJ.

TABLE 15

Figure 18:
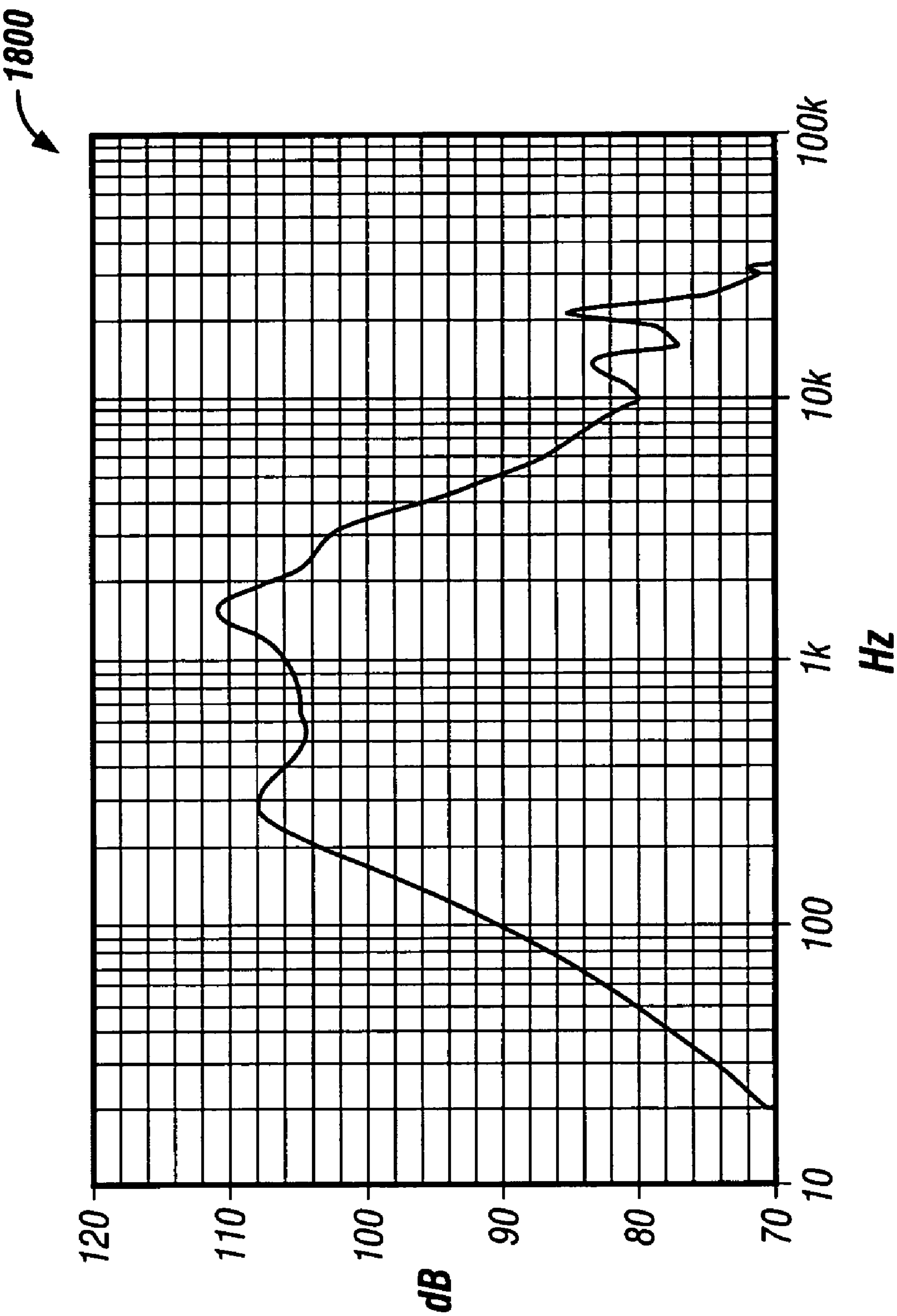
FIG. 18 is a graph of audio characteristics of an earphone in accordance with an illustrative embodiment of the invention.

This table contains information concerning FIG. 18. A graph 1800 of audio characteristics of an earphone is shown in FIG. 18.

5-4 Test Of Output Sound Pressure Frequency Characteristics.
Changing the frequency after added 1000 Hz 1 mW (0.179 V) at the input tip of earphone with constant voltage of sine wave input power at the standard status, there shall not be great difference with output sound pressure frequency characteristics shown in the graph 1800.

Using B&K 4153 COUPLER
X: 1.000 kHz *Y: 106.03 dB ZA: Live Curve SSR Fund.
A: Frequency Response, Magn dB re 20.00 μPa/V
Mode: SSR TABLE 15-continued This table contains information concerning FIG. 18.
A graph 1800 of audio characteristics of an earphone is shown in FIG. 18.

5-5 Test Of Sensitivity
The sound pressure shall be within 105 ± 3 dB after added 1000 Hz, 1 mW (0.179 V) of sine wave input power.
5-6 Test Of Continuation Activation
It should be satisfied with article 5-1 after added 10 □ (0.556 V) of white noise for 48 hours on input terminal under the status of leaving earphone free space. □ Normal temperature: 5□□35□, Normal humidity: relative humidity 45%□85%, Normal atmosphere: 860 mbar□1060 mbar.

TABLE 16

Figure 19:
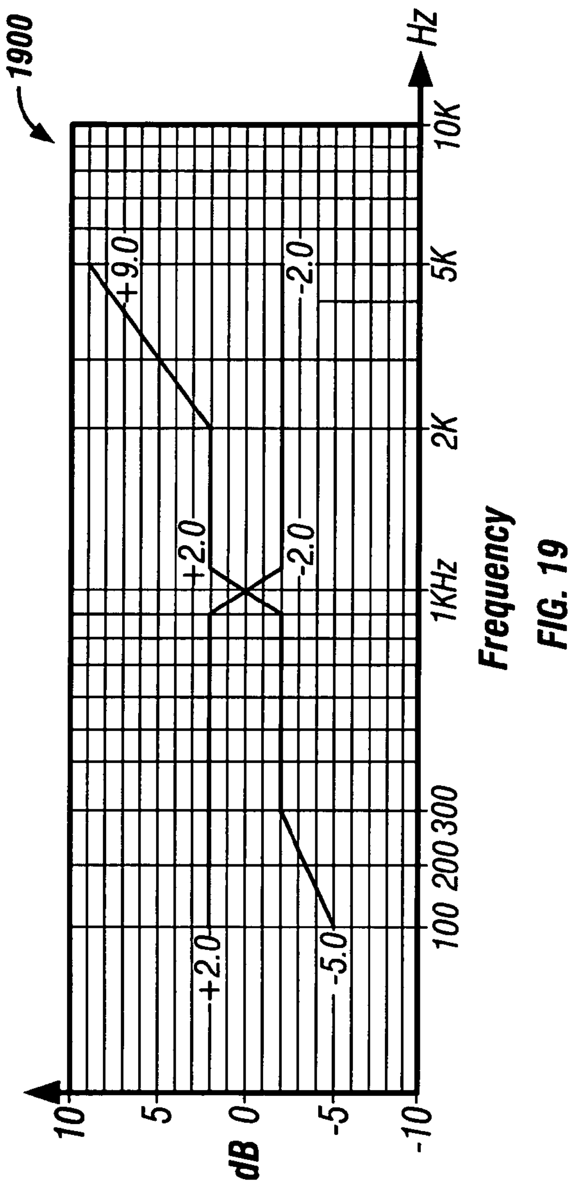
FIG. 19 is a graph of audio characteristics of a microphone in accordance with an illustrative embodiment of the invention.
Figure 20:
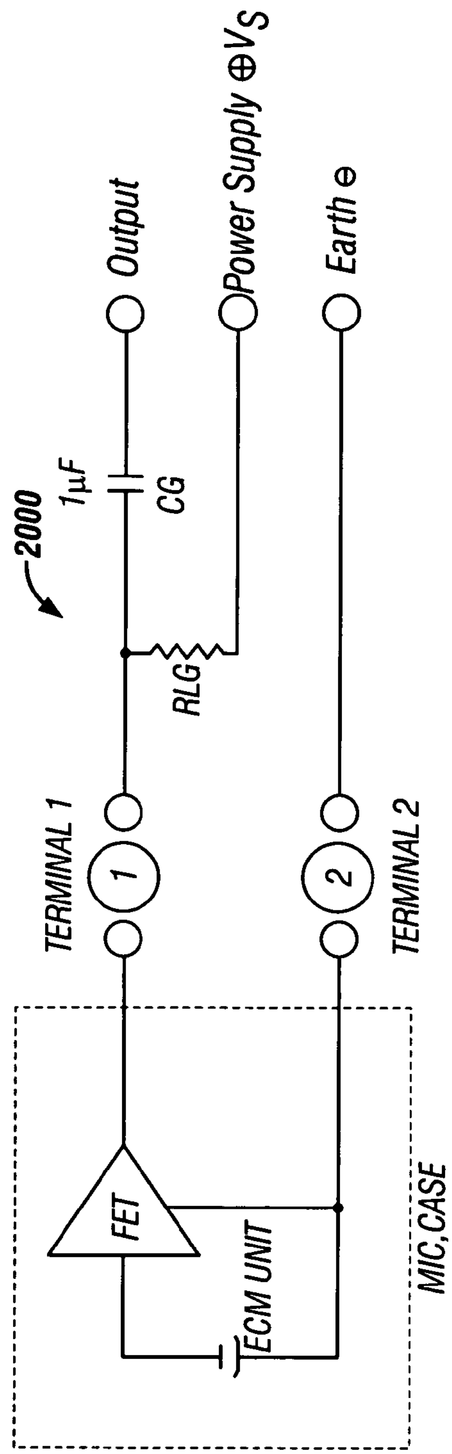
FIG. 20 is a circuit diagram in accordance with an illustrative embodiment of the invention.

This table contains information concerning FIGS. 19 and 20.
A graph 1900 of audio characteristics of a microphone is shown in FIG. 19.
A circuit diagram 2000 is shown in FIG. 20.

6. PERFORMANCE(MIC PART)
6-1 Working Component
Omnidirectional electron condenser microphone.
6-2 Working Test
It should be normal at tone quality volume, noise when activated microphone using amplifier which has lower distortion.
6-3 Frequency Characteristics Test
The frequency characteristics should be within as shown in graph 1900 in FIG. 19 of variation with 2 V of allowed voltage.
STANDARD FREQUENCY CHARACTERISTICS VARIATION
6-4 Sensitivity
Make microphone's sensitivity within −40 dB ± 4 dB,
0 dB = 1 V/1 Pa at 1□, allowed voltage 2 V.
6-5 Range Of Using Voltage 1 V□10 V
6-6 Consumption Current 130□□500□
6-7 Impedance 2.2□
6-8 Signal to Noise Ratio 58 dB f = 1□, S.P.L. = 1 Pa A curve
6-9 Connect zener diode and condenser between microphone's terminals.
Zener Diode (Chip type); 12 V (GENERAL SEMICONDUCTOR)
In FIG. 20, RL: 2.2 kΩ (external resistor)

TABLE 17

This table also contains information concerning FIGS. 19 and 20.

6. PERFORMANCE (MICROPHONE COMPONENT)
6-1 Working Component
Omni-directional electron condenser microphone.
6-2 Working Test
It should be normal at tone quality volume and noise when activating microphone (While using the amplifier, which has lower distortion.)
6-3 Frequency Characteristics Test
The frequency characteristics should be within as shown in graph 1900 in FIG. 19 of variation with 2 V of allowed voltage.
STANDARD FREQUENCY CHARACTERISTICS VARIATION
6-4 Sensitivity
Make microphone's sensitivity within −44 dB ± 4 dB, 0 Db = 1 V/1 Pa at 1□, allowed voltage 2 V.
6-5 Range Of Using Voltage 1 v□10 V
6-6 Consumption Current 130□□500□
6-7 Impedance 2.2□
6-8 Signal to Noise Ratio 58 dB f = 1□, S.P.L. = 1 Pa A curve
6-9 Connect zener diode and condenser between microphone's terminals.
Zener Diode (Chip type); 12 V (GENERAL SEMICONDUCTOR)

TABLE 18

Figure 21:
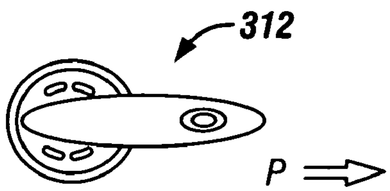
FIG. 21 is a rear view of an earbud housing in accordance with an illustrative embodiment of the invention.
Figure 22:
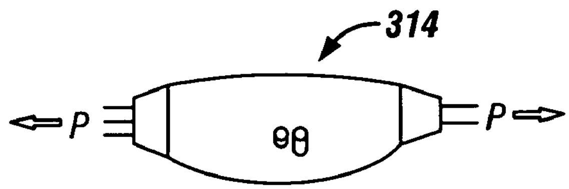
FIG. 22 is a side view of a microphone case in accordance with an illustrative embodiment of the invention.
Figure 23:
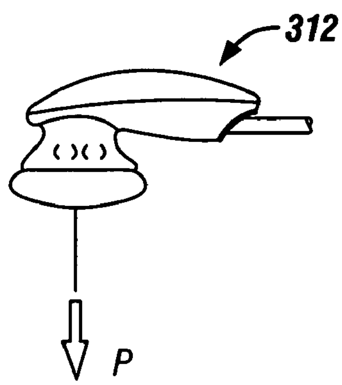
FIG. 23 is a side view of an earbud housing in accordance with an illustrative embodiment of the invention.

This table contains information concerning mechanical characteristics of a hands-free device in accordance with an illustrative embodiment of the invention, and relates to FIGS. 21, 22, and 23. FIG. 21 may be referred to as "EARPHONE SIDE" and FIG. 22 may be referred to as "MIC SIDE".

7 MECHANICAL CHARACTERISTICS
7-1 Bending Intensity
It shall be normal when bended left and right, 20 times for a minute with below each load, respectively.
a) connector part: 5000 times/300 g b) earphone part: 3000 times/100 g
c) mic part
□1string part: 3000 times/100 g □2string part: 3000 times/100 g
7-2 Pulling Intensity
a) There shall not be abnormality about direction, short and covered wire after pulled 5 kg of load which is not moving toward cord direction for a minute holding part.
b) There shall not be abnormality about disconnection, short and covered wire after pulled 3 kg of load which is not moving toward normal direction for a minute holding earphone case and mic side.
7-3 Connection Intensity Of HOUSING + RUBBER RING
Housing and Rubber Ring shall not be separated with each other after P = 250 g power is added.

TABLE 19

Figure 24:
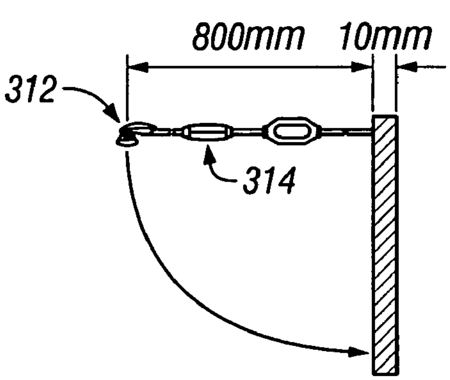
FIG. 24 is a configuration for conducting an impact test of a hands-free device in accordance with an illustrative embodiment of the invention.
Figure 25:
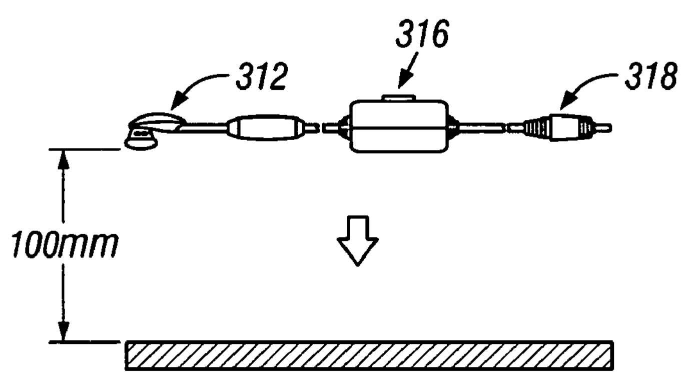
FIG. 25 is a configuration for conducting an impact test of a hands-free device in accordance with an illustrative embodiment of the invention.

This table contains information concerning testing a hands-free device in accordance with an illustrative embodiment of the invention, and relates to FIGS. 24 and 25.

7-4 Impact Test
□ There shall not be malfunction after naturally fall to like figure (FIG. 24) as shown 10 mm thickness of wooden plate 5 times.
□ There shall not be malfunction after naturally fall to P-tile 6 times like figure (FIG. 25) as shown.
8. VEERING TEST
The cord shall not veer to PS.ABS.AS. and POLYCARVONATE with 60□, 72 hours. (Weight 500 g)
9. ENVIRONMENTAL TEST
It should satisfy with article 4-1, 5-1, 5-4 and 5-5 after each below test is executed.

| ITEM | CONDITIONS | TESTING TIME | LEAVING TIME |
|---|---|---|---|
| TEMPERA-TURE-PROOF | TEMPERATURE 45 ± 2□ HUMIDITY 90%□95% | 48(H) | 2(H) |
| HIGH HEAT (A) | TEMPERATURE 80 ± 2□ RELATIVE HUMIDITY 95% | 48(H) | 2(H) |
| COLD-PROOF | TEMPERATURE −40 ± 2□ | 6(H) | 2(H) |
| CYCLE TEST | 0.5(H) TEMPERATURE 80□(0.5 H)-40□(1 H) 0.5(H) | 3 CYCLE | 2(H) |

TABLE 20

Figure 26:
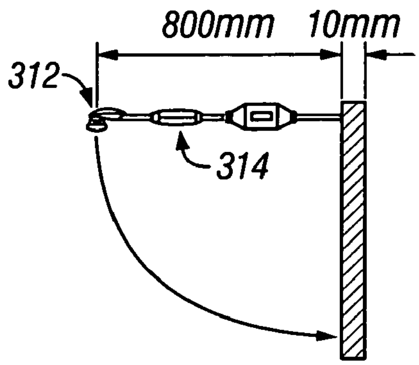
FIG. 26 is a configuration for conducting an impact test of a hands-free device in accordance with an illustrative embodiment of the invention.
Figure 27:
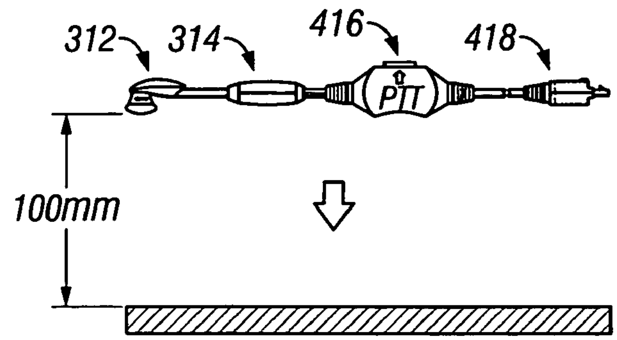
FIG. 27 is a configuration for conducting an impact test of a hands-free device in accordance with an illustrative embodiment of the invention.

This table contains information concerning testing a hands-free device in accordance with an illustrative embodiment of the invention, and relates to FIGS. 26 and 27.

7-4 Impact Test
□There shall not be malfunction after naturally falling 5 times (shown (in FIG. 26) hitting a wood board 10 mm thick).
Also, there shall not be malfunction after naturally falling to concrete 6 times (as shown in FIG. 27).
8. VEERING TEST
The cord shall not veer to PS.ABS.AS. and POLYCARVONATE with 60□, 72 hours. (Weight 500 g)

TABLE 20-continued

9. ENVIRONMENTAL TEST
It should satisfy with article 4-1, 5-1, 5-4 and 5-5 after each below test is executed.

| ITEM | CONDITIONS | TESTING TIME | LEAVING TIME |
|---|---|---|---|
| TEMPERA-TURE-PROOF | TEMPERATURE 45 ± 2□ HUMIDITY 90%□95% | 48(H) | 2(H) |
| HIGH HEAT (A) | TEMPERATURE 80 ± 2□ RELATIVE HUMIDITY 95% | 48(H) | 2(H) |
| COLD-PROOF | TEMPERATURE −40 ± 2□ | 6(H) | 2(H) |
| CYCLE TEST | 0.5(H) TEMPERATURE 80□(0.5 H)-40□(1 H) 0.5(H) | 3 CYCLE | 2(H) |

TABLE 21

This table contains information concerning a hands-free device in accordance with an illustrative embodiment of the invention, and testing the hands-free device.

10. CONTINUATION LOAD TEST
It should be compliant with article 5-1 after 20 mW(0.8 V) of white noise signal is added for 500 hours to input power terminal under the status of the feeder regulated by EIAJ RC-7502 is in the free space.

11. VIBRATION-PROOF TEST
It should be compliant with article 4-1, 5-1, 5-4 and 5-5 after each below test is executed.
* The test be executed with minimum packing status.

| | |
|---|---|
| R.P.M | 500 □ 1500 R.P.M |
| WIDTH OF VIBRATION | 2 mm |
| DIRECTION | 3 directional of upper-down, left and right, and toward and backward |
| TIMES | 20 mm per each direction |
| STATUS | sine wave |

12. INSULATION RESISTANCE
It should be above 5□ after DC 250 V added to exposure surface of earphone for a minute.

13. VOLTAGE-PROOF
There should not be insulation degradation after DC 250 V frequency added to exposure surface of earphone for a minute.

TABLE 22

Figure 28:
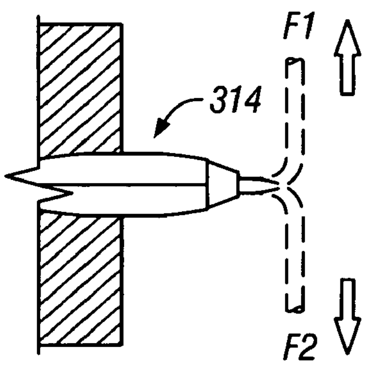
FIG. 28 is a configuration for conducting a test of a microphone case in accordance with an illustrative embodiment of the invention.
Figure 29:
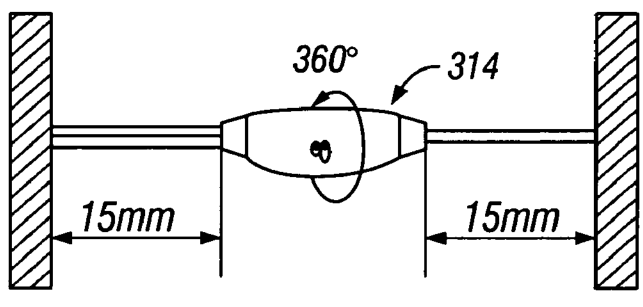
FIG. 29 is a configuration for conducting a test of a microphone case in accordance with an illustrative embodiment of the invention.

This table contains information concerning FIGS. 28 and 29.

16. SPEC. FOR REMOTE CONTROLLER'S PARTS 16-1. Intensity Of Case (FIG. 28)
It should be normal with F1, F2 = 2 kg, for a minute holding half of the case.

16-2. Rotating intensity of case (FIG. 29)
It should be normal with 1000 times of revolution.

What is claimed is:

1. A hands-free device for hands-free communications with a cellular telephone/two-way radio and for instructing the cellular telephone/two-way radio to transmit in a half duplex communications mode for a two-way radio conversation, and for instructing the cellular telephone/two-way radio to establish communications for a full duplex cellular telephone conversation, the hands-free device comprising:

a plug assembly, the plug assembly having a plug and a plug assembly circuit board, the plug having a VCC pin, a ground pin, a transmit pin, a receive pin, and a PTT pin, the plug assembly circuit board having a transmit connection area coupled to the transmit pin, a receive connection area coupled to the receive pin, an analog ground connection area coupled to the ground pin, a PTT connection area coupled to the PTT pin, and a PTT ground connection area coupled to the ground pin;

a switch assembly, the switch assembly comprising:

a momentary contact switch having a depressed position and a nondepressed position, and a first terminal and a second terminal, wherein the first terminal is coupled to the second terminal when the momentary contact switch is in the depressed position;

a switch assembly circuit board having a primary transmit pad coupled to a secondary transmit pad, a primary receive pad coupled to a secondary receive pad, and a primary analog ground pad coupled to a secondary analog ground pad;

a microphone assembly comprising:

a microphone having a first lead and a second lead; and a microphone assembly circuit board, the microphone assembly circuit board having a transmit pad and an analog ground pad;

an earpiece having a first connector and a second connector; and a single cable, the single cable comprising a base section and an extension section, the base section comprising:

a transmit wire having a proximal end and a distal end, the proximal end of the transmit wire being coupled to the transmit connection area, and the distal end of the transmit wire being coupled to the primary transmit pad on the switch assembly circuit board;

a receive wire having a proximal end and a distal end, the proximal end of the receive wire being coupled to the receive connection area, and the distal end of the receive wire being coupled to the primary receive pad on the switch assembly circuit board;

an analog ground wire having a proximal end and a distal end, the proximal end of the analog ground wire being coupled to the ground connection area, and the distal end of the analog ground wire being coupled to the primary analog ground pad on the switch assembly circuit board;

a PTT wire having a proximal end and distal end, the proximal end of the PTT wire being coupled to the PTT connection area, and the distal end of the PTT wire being coupled to the first terminal of the momentary contact switch; and a PTT ground wire having a proximal end and a distal end, the proximal end of the PTT ground wire being coupled to the PTT ground connection area, and the distal end of the PTT wire being coupled to the second terminal of the momentary contact switch;

the extension section of the single cable comprising:

a transmit wire extension having a proximal end coupled to the secondary transmit pad on the switch assembly circuit board, and a distal end coupled to the transmit pad on the microphone assembly circuit board;

a receive wire extension having a proximal end coupled to the secondary receive pad on the switch assembly circuit board, and a distal end coupled to the first connector of the earpiece;

a first analog ground wire extension having a proximal end coupled to the secondary analog ground pad on the switch assembly circuit board, and a distal end coupled to the analog ground pad on the microphone assembly circuit board; and a second analog ground wire extension having a proximal end coupled to the secondary analog ground pad on the switch assembly circuit board, and a distal end coupled to the second connector of the earpiece.

2. The hands-free device of claim 1, wherein the single cable further comprises:

a first insulating sheath enclosing the transmit wire, the receive wire, the analog ground wire, the PTT wire, and the PTT ground wire, between the plug assembly and the switch assembly;

a second insulating sheath enclosing the transmit wire extension and the first analog ground wire extension, between the switch assembly and the microphone assembly; and a third insulating sheath enclosing the receive wire extension and the second analog ground wire extension between the switch assembly and the earpiece.

3. A hands-free device for hands-free communications with a cellular telephone/two-way radio and for instructing the cellular telephone/two-way radio to transmit in a half duplex communications mode for a two-way radio conversation, and for instructing the cellular telephone/two-way radio to establish communications for a full duplex cellular telephone conversation, the hands-free device comprising:

a plug assembly, the plug assembly having a plug and a plug assembly circuit board/terminal interface, the plug having a POW pin, an audio out pin, a ground pin, a VCC pin, a PTT pin, an audio in pin, and an analog ground pin, the plug assembly circuit board/terminal interface having a POW connection area coupled to the POW pin, an audio out connection area coupled to the audio out pin, a ground connection area coupled to the ground pin, a VCC connection area coupled to the VCC pin, a PTT connection area coupled to the PTT pin, an audio in connection area coupled to the audio in pin, and an analog ground connection area coupled to the analog ground pin;

an interface circuit board, comprising:

a POW pad, an audio out pad, a first ground pad, a VCC pad, a first PTT pad, an audio in pad, an analog ground pad, a positive speaker pad, a negative speaker pad, a second PTT pad, a second ground pad, a mic pad, and a second analog ground pad;

a switch assembly, comprising:

a momentary contact switch having a depressed position and a nondepressed position, and a first terminal and a second terminal, wherein the first terminal is coupled to the second terminal when the momentary contact switch is in the depressed position;

a switch assembly circuit board having a primary positive speaker pad coupled to a secondary positive speaker pad, a primary negative speaker pad coupled to a secondary negative speaker pad, a primary mic pad coupled to a secondary mic pad, and a primary analog ground pad coupled to a secondary analog ground pad;

a microphone having a mic connection area and an analog ground connection area;

an earpiece having a positive speaker connection area and a negative speaker connection area; and a single cable, the single cable comprising a base section, a middle section, and an extension section, the base section comprising:

a POW wire having a proximal end coupled to the POW connection area and a distal end coupled to the POW pad, an audio out wire having a proximal end coupled to the audio out connection area and a distal end coupled to the audio out pad, a ground wire having a proximal end coupled to the ground connection area and a distal end coupled to the first ground pad, a VCC wire having a proximal end coupled to the VCC connection area and a distal end coupled to the VCC pad, a PTT wire having a proximal end coupled to the PTT connection area and a distal end coupled to the first PTT pad, an audio in wire having a proximal end coupled to the audio in connection area and a distal end coupled to the audio in pad, and an analog ground wire having a proximal end coupled to the analog ground connection area and a distal end coupled to the analog ground pad;

the middle section of the single cable comprising:

a positive speaker wire having a proximal end coupled to the positive speaker pad on the interface circuit board and a distal end coupled to the primary positive speaker pad on the switch assembly circuit board;

a negative speaker wire having a proximal end coupled to the negative speaker pad on the interface circuit board and a distal end coupled to the primary negative speaker pad on the switch assembly circuit board;

a PTT wire having a proximal end coupled to the second PTT pad on the interface circuit board, and a distal end coupled to the first terminal of the momentary contact switch; and a PTT ground wire having a proximal end coupled to the second ground pad on the interface circuit board, and a distal end coupled to the second terminal of the momentary contact switch;

a mic wire having a proximal end coupled to the ground pad on the interface circuit board, and a distal end coupled to the primary mic pad on the switch assembly circuit board;

an analog ground wire having a proximal end coupled to the second analog ground pad on the interface circuit board, and a distal end coupled to the primary analog ground pad on the switch assembly circuit board;

the extension section of the single cable comprising:

a positive speaker wire extension having a proximal end coupled to the secondary positive speaker pad on the switch assembly circuit board, and a distal end coupled to the positive speaker connection area on the earpiece;

a negative speaker wire extension having a proximal end coupled to the secondary negative speaker pad on the switch assembly circuit board, and a distal end coupled to the negative speaker connection area on the earpiece;

a mic wire extension having a proximal end coupled to the secondary mic pad on the switch assembly circuit board, and a distal end coupled to the mic connection area on the microphone; and an analog ground wire extension having a proximal end coupled to the secondary analog ground pad on the switch assembly circuit board, and a distal end coupled to the analog ground connection area on the microphone.

4. The hands-free device of claim 3, wherein the plug further comprises a mode pin, and wherein the plug assembly circuit board/terminal interface further comprises a mode connection area coupled to the mode pin, and wherein the interface circuit board further comprises a mode pad, and wherein the base section of the single cable further comprises a mode wire having a proximal end coupled to the mode connection area and a distal end coupled to the mode pad on the interface circuit board.

5. The hands-free device of claim 3, wherein the single cable further comprises:

a first insulating sheath enclosing the POW wire, the audio out wire, the ground wire, the VCC wire, the PTT wire, the audio in wire, and the analog ground wire, in the base section of the single cable;

a second insulating sheath enclosing the positive speaker wire, the negative speaker wire, the PTT wire, the PTT ground wire, the mic wire, and the analog ground wire in the middle section of the single cable; and a third insulating sheath enclosing the positive speaker wire extension, the negative speaker wire extension, the mic wire extension, and the analog ground wire extension over at least a portion of the extension section of the single cable.

* * * * *